(12) United States Patent
Udagawa et al.

(10) Patent No.: US 8,564,159 B2
(45) Date of Patent: Oct. 22, 2013

(54) TRANSFORMER INRUSH CURRENT SUPPRESSION APPARATUS

(75) Inventors: Keisuke Udagawa, Urayasu (JP);
Tadashi Koshizuka, Saitama (JP); Shiro Maruyama, Yokohama (JP); Minoru Saito, Kamakura (JP); Noriyuki Nagayama, Tokorozawa (JP)

(73) Assignee: Kabushiki Kaisha Toshiba (JP)

( * ) Notice: Subject to any disclaimer, the term of this patent is extended or adjusted under 35 U.S.C. 154(b) by 438 days.

(21) Appl. No.: 13/014,892

(22) Filed: Jan. 27, 2011

(65) Prior Publication Data
US 2011/0181989 A1  Jul. 28, 2011

(30) Foreign Application Priority Data

Jan. 28, 2010 (JP) .................................. 2010-017263

(51) Int. Cl.
*H01H 47/00* (2006.01)
(52) U.S. Cl.
USPC ......................................................... 307/125
(58) Field of Classification Search
USPC .................... 307/35, 101, 125; 323/355, 356; 361/110, 35, 36
See application file for complete search history.

(56) References Cited

U.S. PATENT DOCUMENTS

| 6,493,203 | B1 | 12/2002 | Ito et al. |
| 2004/0124814 | A1 | 7/2004 | Tsutada et al. |
| 2010/0039737 | A1 | 2/2010 | Koshizuka et al. |
| 2010/0141235 | A1 | 6/2010 | Koshiduka et al. |

FOREIGN PATENT DOCUMENTS

| CN | 1308354 A | 8/2001 |
| CN | 101563744 A | 10/2009 |
| CN | 101609983 A | 12/2009 |
| JP | 2002-075145 | 3/2002 |
| JP | 2004-208394 A | 7/2004 |
| JP | 2008-160100 | 7/2008 |

OTHER PUBLICATIONS

Brunke, John H. et al., "Elimination of Transformer Inrush Currents by Controller Switching—Part I: Theoretical Considerations", IEEE Transations on Power Delivery, vol. 16, No. 2, Apr. 2001, pp. 276-280.

Chinese Office Action for Application No. 201110037342.7 mailed Mar. 19, 2013 with English translation (40 pages).

*Primary Examiner* — Daniel Cavallari
(74) *Attorney, Agent, or Firm* — Harness, Dickey & Pierce, P.L.C.

(57) ABSTRACT

Inrush current suppression apparatus for suppressing a transformer inrush current including a transformer side voltage measurement unit which measures a voltage at a side of a transformer, a residual magnetic flux calculation unit which calculates three line-to-line residual magnetic fluxes, a power supply side voltage measurement unit which measures a voltage at a side of a power supply, a stable-state magnetic flux calculation unit which calculates three line-to-line stable-state magnetic fluxes, based on the voltage at the side of the power supply, a phase determination unit which determines a phase in which phases of the three line-to-line stable-state magnetic fluxes are respectively the same in polarity as phases of the three line-to-line residual magnetic fluxes, and a closing unit which closes the circuit breaker in the phase determined by the phase determination unit.

48 Claims, 18 Drawing Sheets

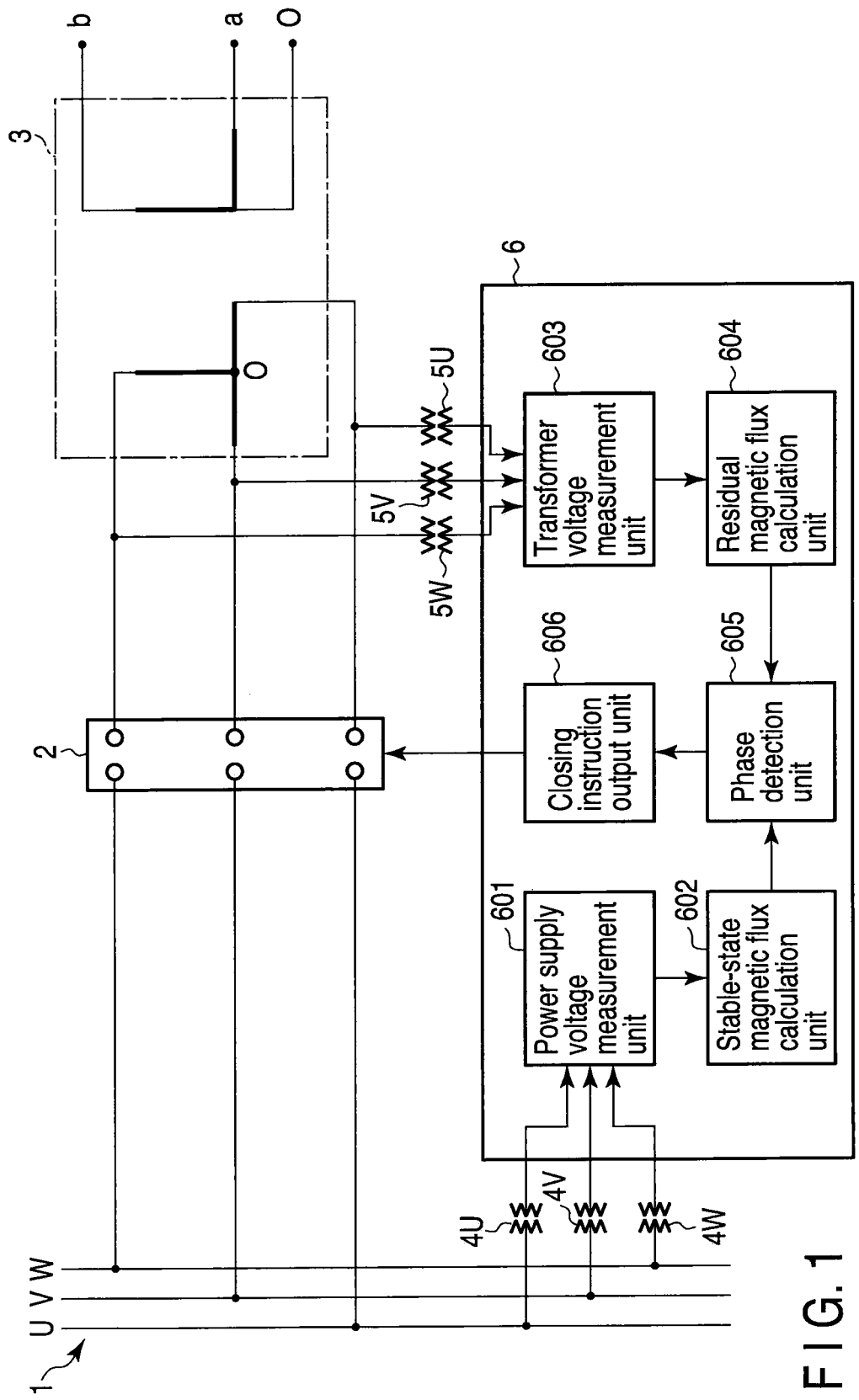
F I G. 1

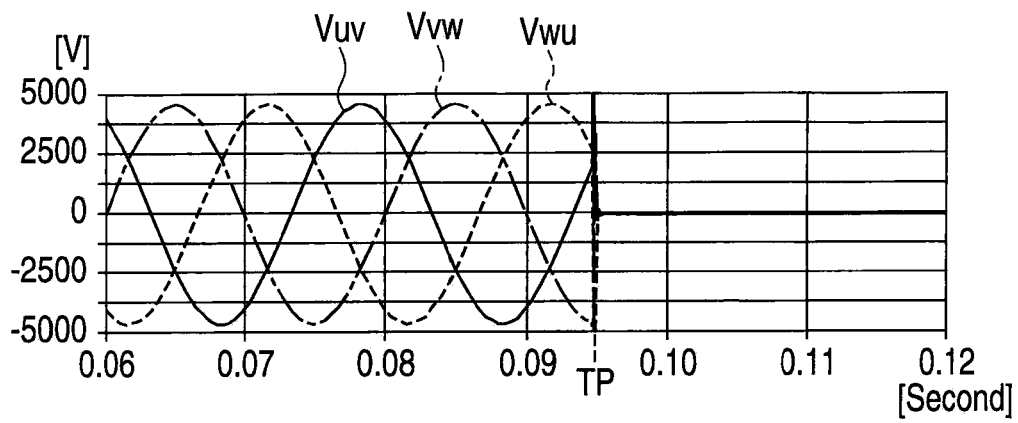
F I G. 1 2
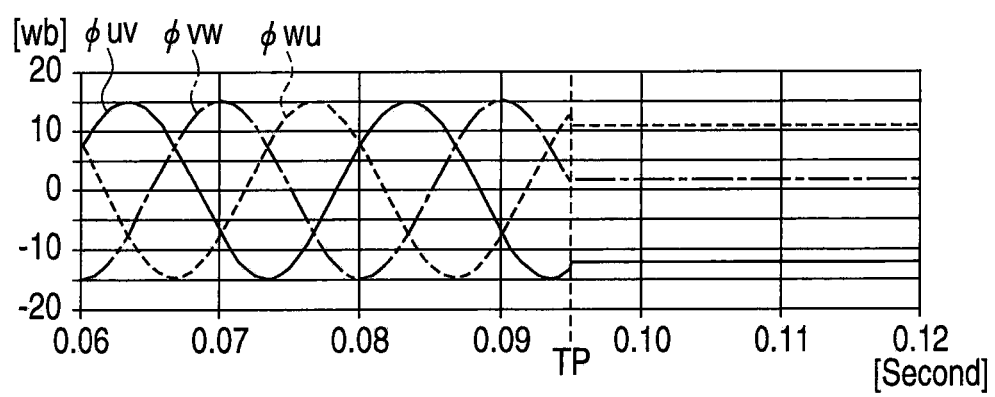
F I G. 1 3
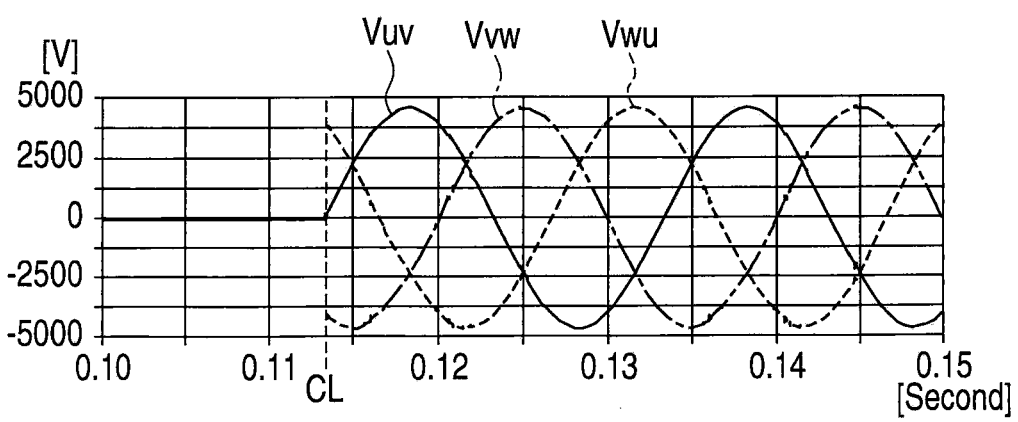
F I G. 1 4

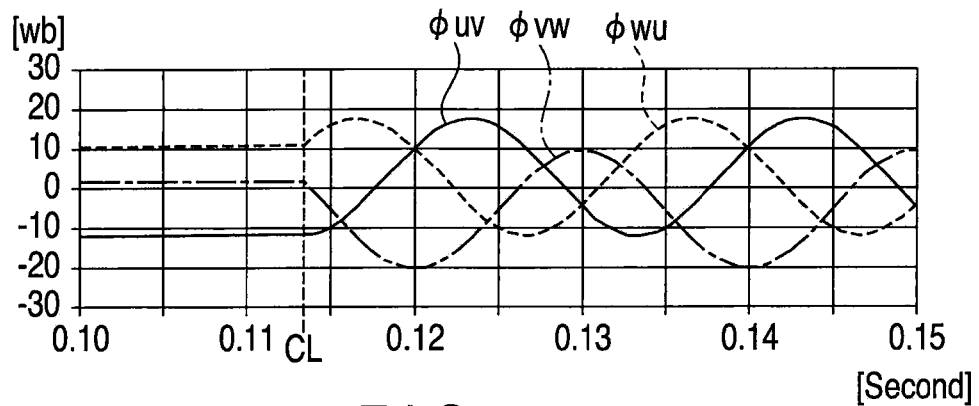
F I G. 1 5
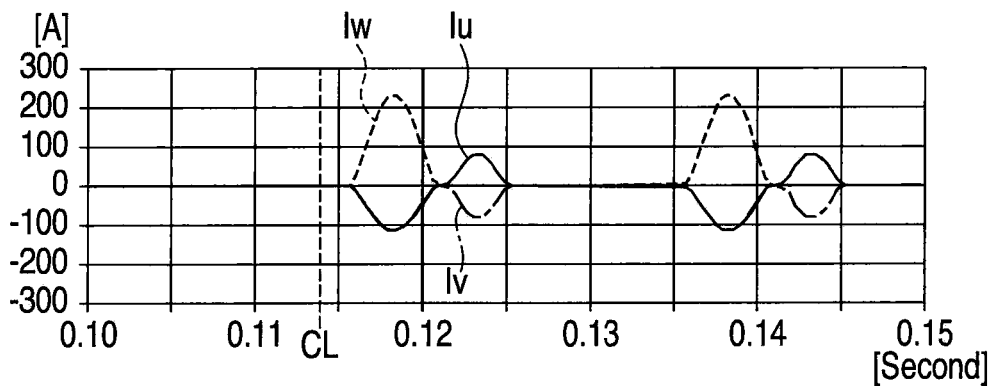
F I G. 1 6

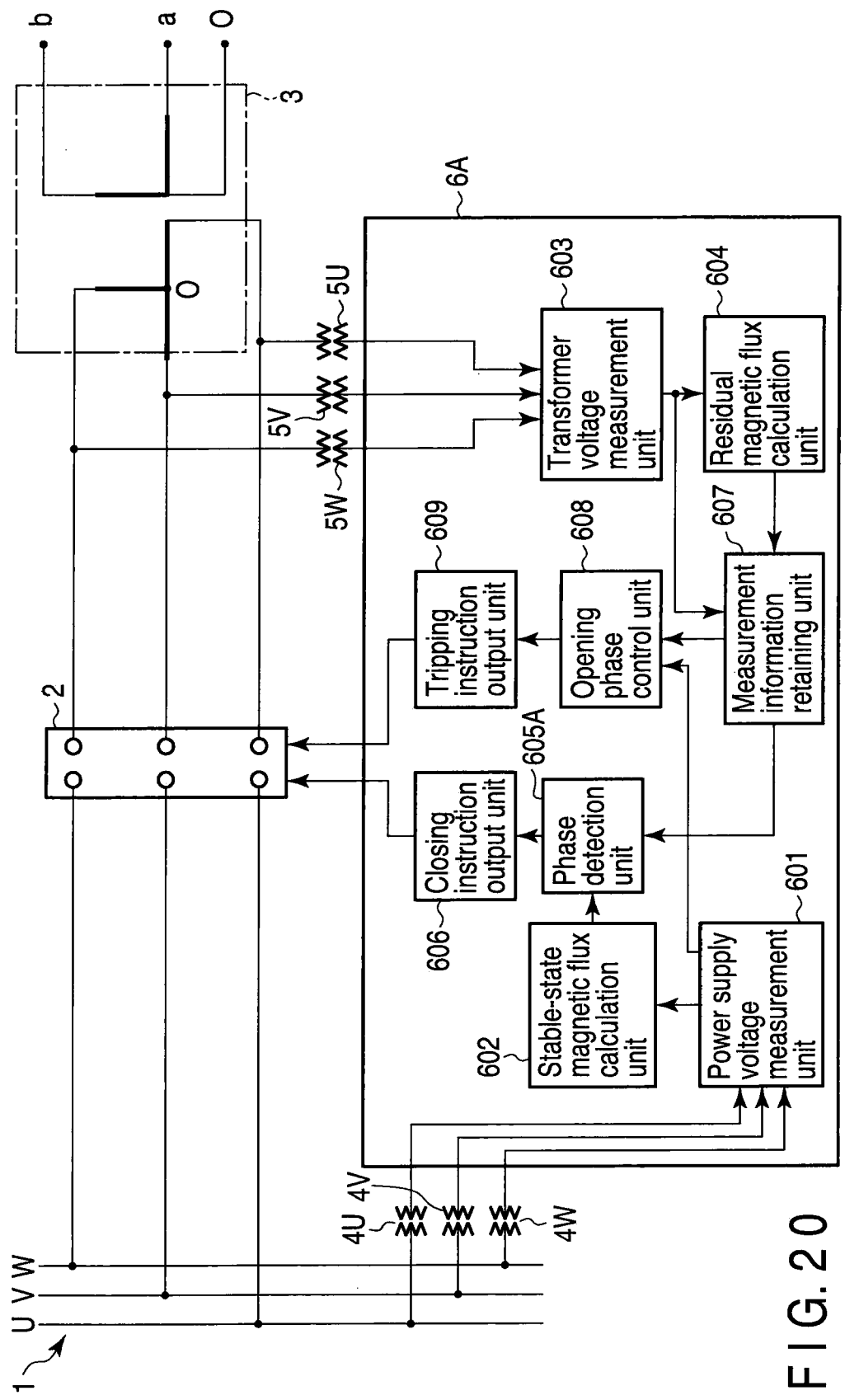
F I G. 20

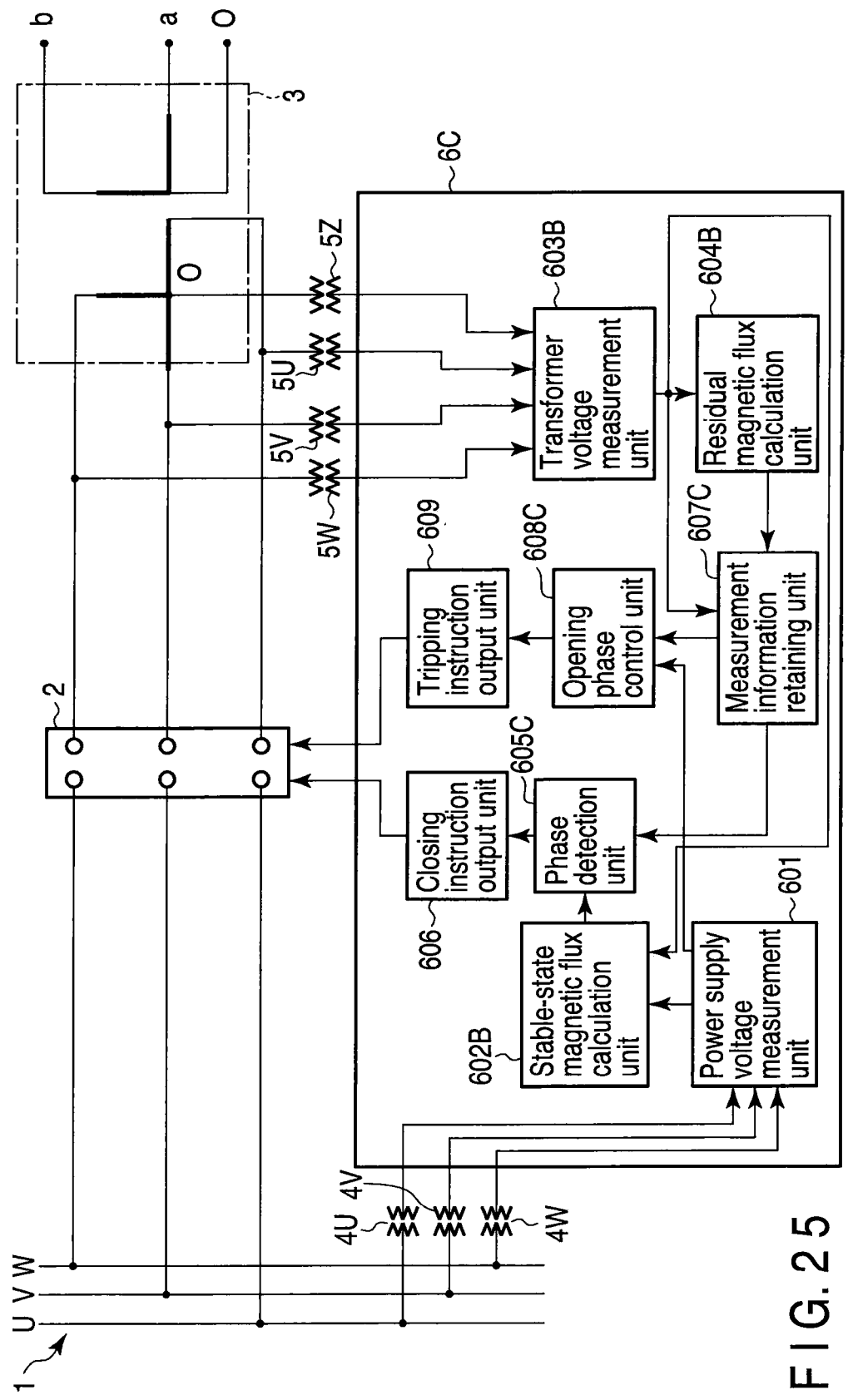
F I G. 25

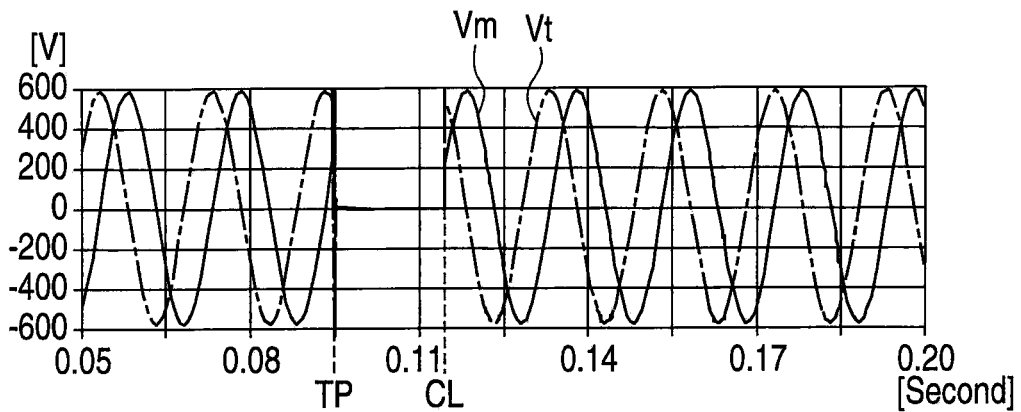
F I G. 3 4
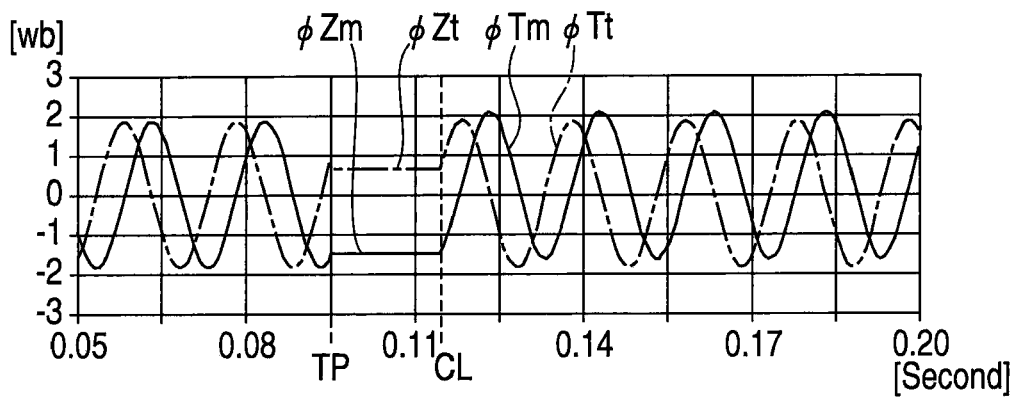
F I G. 3 5
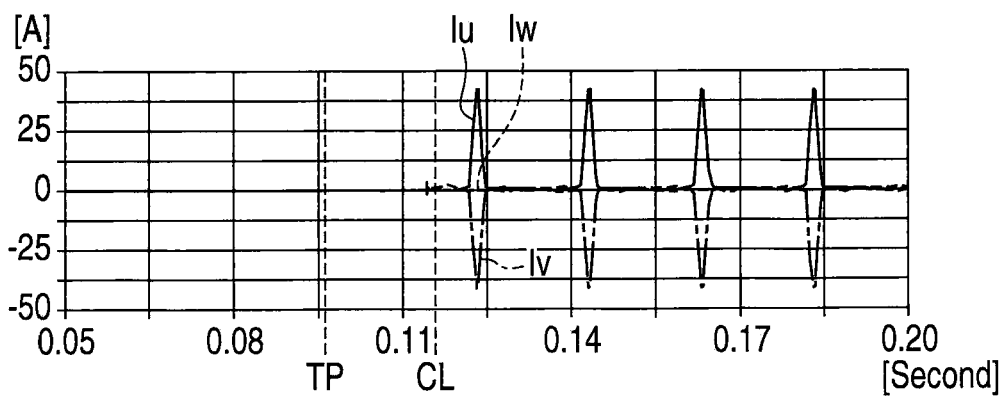
F I G. 3 6

TRANSFORMER INRUSH CURRENT SUPPRESSION APPARATUS

CROSS-REFERENCE TO RELATED APPLICATIONS

This application is based upon and claims the benefit of priority from prior Japanese Patent Application No. 2010-017263, filed Jan. 28, 2010, the entire contents of which are incorporated herein by reference.

BACKGROUND OF THE INVENTION

1. Field of the Invention

The present invention relates to a transformer inrush current suppression apparatus for suppressing a transformer inrush current which occurs when a circuit breaker is closed.

2. Description of the Related Art

When a transformer is energized without any load by being connected to a power supply while there is residual magnetic flux in a transformer core, a large transformer inrush current is known to flow. The magnitude of this transformer inrush current is several times larger than the rated load current of the transformer. When such a large transformer inrush current flows, the system voltage fluctuates, and when this voltage fluctuation is large, this many affect electric power consumers.

Accordingly, there is known a method for suppressing a transformer inrush current, and this method uses a resistor-attached circuit breaker including a closing resistor and a contact which are connected in series. In this method, the resistor-attached circuit breaker is connected in parallel with a main contact of a circuit breaker. The resistor-attached circuit breaker is closed in advance of closing the main contact of the circuit breaker. Therefore, this suppresses the transformer inrush current (see, for example, Jpn. Pat. Appln. KOKAI Publication No. 2002-075145).

There is known another suppression method. In this method, when a directly-grounded three-phase transformer is energized with three single-phase circuit breakers, any one single-phase circuit breaker is closed in advance, and thereafter the remaining two single-phase circuit breakers are closed, to suppress the transformer inrush current (for example, John H. Brunke et al., "Elimination of Transformer Inrush Currents by Controlled Switching—Part I: Theoretical Considerations", IEEE TRANSACTIONS ON POWER DELIVERY, IEEE, April, 2001, Vol 0.16, No. 2, p. 276-280).

There is also disclosed a method for suppressing a transformer inrush current when a non-effectively grounded three-phase transformer is energized with a three-phase collective-operation circuit breaker. In this method, a value of magnetic flux remaining in a core is measured when the transformer is disconnected. When the transformer is energized, the transformer inrush current is suppressed by controlling a closing phase of the circuit breaker (see, for example, Jpn. Pat. Appln. KOKAI Publication No. 2008-160100).

On the other hand, a Scott connection is known as a method for converting a three-phase alternating current voltage into single-phase alternating current voltages. In the Scott connection, two single-phase transformers are connected, so as to convert a three-phase alternating current voltage into two pairs of single-phase alternating current voltages. For example, a Scott connection transformer is used when electric power is supplied to a single-phase electric furnace or a single-phase alternating-current electric train.

However, the above methods for suppressing transformer inrush currents have the following problems.

In the method for suppressing a transformer inrush current using a resistor-attached circuit breaker, there is a problem in that it is necessary to add a resistor-attached circuit breaker to an ordinary circuit breaker. Therefore, the overall size of the circuit breaker is larger.

In any of the methods for suppressing the transformer inrush currents, it is not expected to disconnect the Scott connection transformer or the like that converts a three-phase alternating current voltage into two pairs of single-phase alternating current voltages.

For example, in the method for measuring the residual magnetic flux and controlling the closing phase of the circuit breaker, the method for controlling the three-phase transformer used for a power system cannot be directly applied to the Scott connection transformer. In the case of the Scott connection transformer, the magnetic flux of the transformer core cannot be directly calculated by measuring phase voltages or line-to-line voltages (voltages between lines) at the primary side.

BRIEF SUMMARY OF THE INVENTION

An object of the present invention is to provide a transformer inrush current suppression apparatus capable of controlling a closing phase in order to suppress a transformer inrush current of a circuit breaker that makes and breaks connection between a transformer converting a three-phase alternating current voltage into single-phase alternating current voltages and a three-phase alternating current power system including a power supply.

According to an aspect of the present invention, there is provided a transformer inrush current suppression apparatus for suppressing a transformer inrush current of a circuit breaker which makes and breaks connection between an electric power system for a three-phase alternating current, including a power supply and a transformer which converts a three-phase alternating current voltage into a single-phase alternating current voltage, the transformer inrush current suppression apparatus comprising: a transformer side three-phase alternating current voltage measurement unit which measures the three-phase alternating current voltage at a side of the transformer with respect to the circuit breaker; a residual magnetic flux calculation unit which calculates three line-to-line residual magnetic fluxes of the transformer generated after the transformer is detached by the circuit breaker, based on the three-phase alternating current voltage measured by the transformer side three-phase alternating current voltage measurement unit; a power supply side three-phase alternating current voltage measurement unit which measures a three-phase alternating current voltage at a side of the power supply with respect to the circuit breaker; a stable-state magnetic flux calculation unit which calculates three line-to-line stable-state magnetic fluxes of the transformer, based on the three-phase alternating current voltage measured by the power supply side three-phase alternating current voltage measurement unit; a phase determination unit which determines a phase in which phases of the three line-to-line stable-state magnetic fluxes calculated by the stable-state magnetic flux calculation unit are respectively the same in polarity as phases of the three line-to-line residual magnetic fluxes calculated by the residual magnetic flux calculation unit; and a closing unit which closes the circuit breaker in the phase determined by the phase determination unit.

BRIEF DESCRIPTION OF THE SEVERAL VIEWS OF THE DRAWING

FIG. 12 is a waveform chart illustrating an example of state of primary line-to-line voltages before and after tripping with the transformer inrush current suppression apparatus according to the first embodiment of the present invention;

FIG. 13 is a waveform chart illustrating an example of a state of primary line-to-line magnetic fluxes before and after tripping with the transformer inrush current suppression apparatus according to the first embodiment of the present invention;

FIG. 14 is a waveform chart illustrating an example of a state of primary line-to-line voltages before and after closing with the transformer inrush current suppression apparatus according to the first embodiment of the present invention;

FIG. 15 is a waveform chart illustrating an example of a state of primary line-to-line magnetic fluxes before and after closing with the transformer inrush current suppression apparatus according to the first embodiment of the present invention;

FIG. 16 is a waveform chart illustrating an example of a state of transformer inrush currents before and after closing with the transformer inrush current suppression apparatus according to the first embodiment of the present invention;

FIG. 17 is a waveform chart illustrating an example of a state of primary line-to-line voltages before and after energizing the Scott connection transformer with a conventional circuit breaker;

FIG. 20 is a block diagram illustrating a configuration of an electric power system including a transformer inrush current suppression apparatus according to a second embodiment of the present invention;

FIG. 25 is a block diagram illustrating a configuration of an electric power system including a transformer inrush current suppression apparatus according to a fourth embodiment of the present invention;

FIG. 34 is a waveform chart illustrating an example of a state of secondary voltages from tripping to closing with the transformer inrush current suppression apparatus according to the sixth embodiment of the present invention;

FIG. 35 is a waveform chart illustrating an example of a state of secondary winding magnetic fluxes from tripping to closing with the transformer inrush current suppression apparatus according to the sixth embodiment of the present invention;

FIG. 36 is a waveform chart illustrating an example of a state of transformer inrush currents from tripping to closing with the transformer inrush current suppression apparatus according to the sixth embodiment of the present invention.

DETAILED DESCRIPTION OF THE INVENTION

Embodiments of the present invention will be hereinafter explained with reference to the drawings.

First Embodiment

Figure 1:
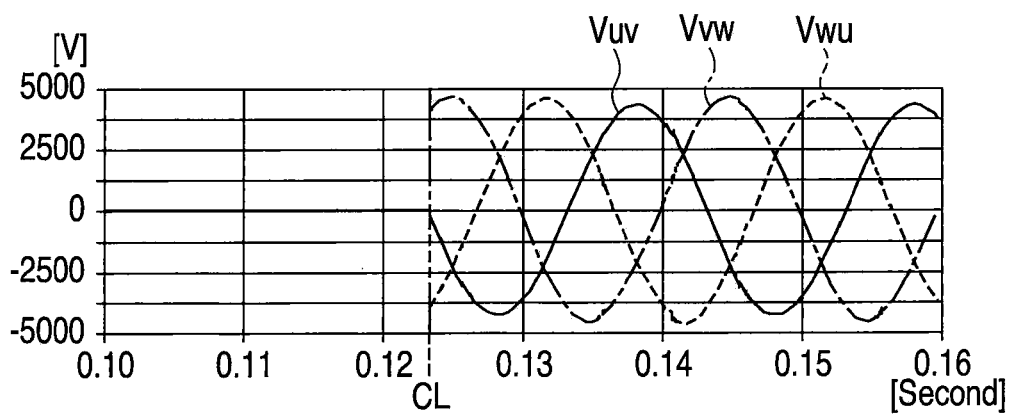
FIG. 1 is a block diagram illustrating a configuration of an electric power system including a transformer inrush current suppression apparatus according to a first embodiment of the present invention.

FIG. 1 is a block diagram illustrating a configuration of an electric power system including a transformer inrush current suppression apparatus 6 according to the first embodiment of the present invention. In the following drawings, the same portions are denoted with the same reference numerals, and detailed description thereof is omitted. Different portions will be mainly explained. Likewise, overlapped explanations are omitted in the subsequent embodiments.

The electric power system according to the present embodiment includes a power supply busbar 1, a circuit breaker 2, a Scott connection transformer 3, power supply voltage detectors 4U, 4V, 4W for three phases arranged in the power supply busbar 1, transformer primary side voltage detectors 5U, 5V, 5W for three phases arranged at the primary side of the Scott connection transformer 3, and a transformer inrush current suppression apparatus 6.

The power supply busbar 1 is a busbar for an electric power system including a power supply for a three-phase alternating current including U-phase, V-phase, and W-phase.

The Scott connection transformer 3 is connected to the power supply busbar 1 via the circuit breaker 2. The Scott connection transformer 3 is installed as an effectively grounded system or non-effectively grounded system. The Scott connection transformer 3 converts a three-phase alternating current voltage supplied from the power supply busbar 1 into two pairs of single-phase alternating current voltages. In the Scott connection transformer 3, a three-phase alternating current side is referred to as a primary side, and single-phase alternating currents side is referred to as a secondary side.

The circuit breaker 2 is arranged between the power supply busbar 1 and the Scott connection transformer 3. The circuit breaker 2 is a three-phase collective-operation circuit breaker in which main contacts of all the three-phases, i.e., U-phase, V-phase, and W-phase, are collectively operated. When the circuit breaker 2 is closed, electric power is supplied to the Scott connection transformer 3 via the power supply busbar 1. When the circuit breaker 2 is opened, the Scott connection transformer 3 is cut off from the power supply busbar 1.

The three power supply voltage detectors 4U, 4V, 4W are measurement devices for measuring phase voltages (voltages to ground) of the U-phase, V-phase, W-phase, respectively, of the power supply busbar 1. The power supply voltage detectors 4U, 4V, 4W are, for example, voltage transformers (VT). The power supply voltage detectors 4U, 4V, 4W output detection values, as detection signals, to the transformer inrush current suppression apparatus 6.

The three transformer primary side voltage detectors 5U, 5V, 5W are measurement devices for measuring terminal voltages of primary side terminals (U-phase, V-phase, W-phase), respectively, of the Scott connection transformer 3. The transformer primary side voltage detectors 5U, 5V, 5W are, for example, voltage transformers (VT). The transformer primary side voltage detectors 5U, 5V, 5W output detection values, as detection signals, to the transformer inrush current suppression apparatus 6.

The transformer inrush current suppression apparatus 6 outputs an closing instruction to the main contacts of the circuit breaker 2, based on the detection signals received from the power supply voltage detectors 4U, 4V, 4W and the transformer primary side voltage detectors 5U, 5V, 5W. In this manner, the circuit breaker 2 is closed.

Figure 4:
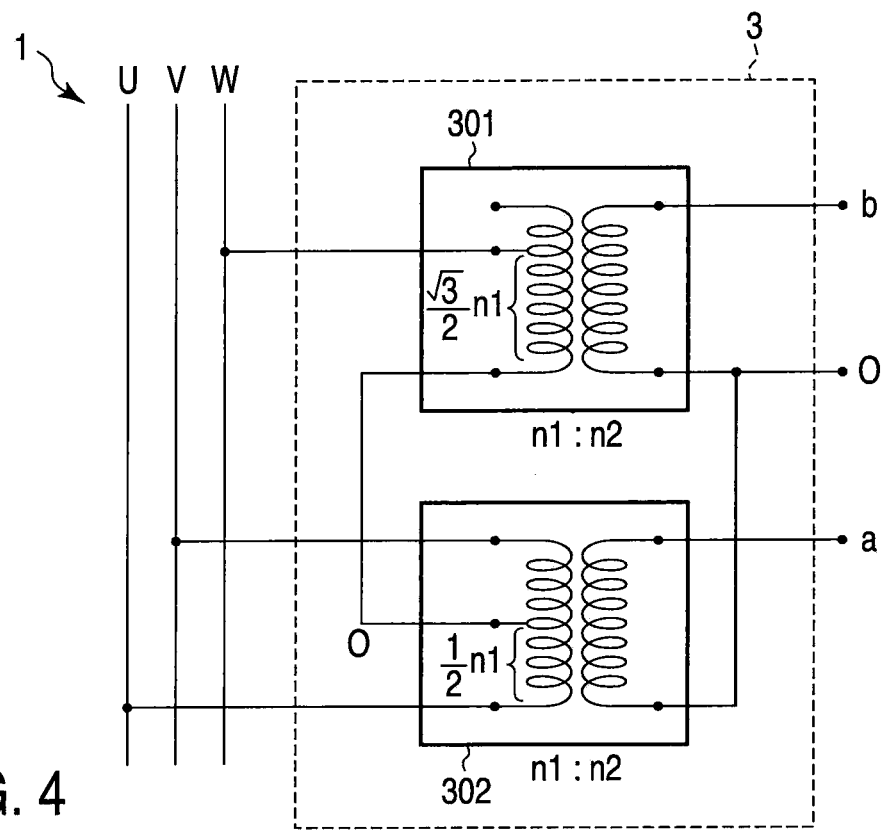
FIG. 4 is a block diagram illustrating a configuration of a Scott connection transformer according to the first embodiment of the present invention.

FIG. 4 is a block diagram illustrating a configuration of the Scott connection transformer 3 according to the present embodiment.

The Scott connection transformer 3 includes two single-phase transformers, i.e., a main transformer 302 and a teaser transformer 301. Two terminals of the primary winding of the main transformer 302 are connected to U-phase and V-phase, respectively. In the main transformer 302, a portion at ½ (0.5) of the primary winding (middle point O) is connected to an end of the primary winding of the teaser transformer 301. The teaser transformer 301 has a tap connected to the W-phase of the power supply busbar 1, wherein the tap has a voltage of 0.866 (√3/2) p.u. when two terminals of the primary winding of the main transformer 302 are connected to the U-phase and V-phase of the power supply busbar 1.

Figure 5:
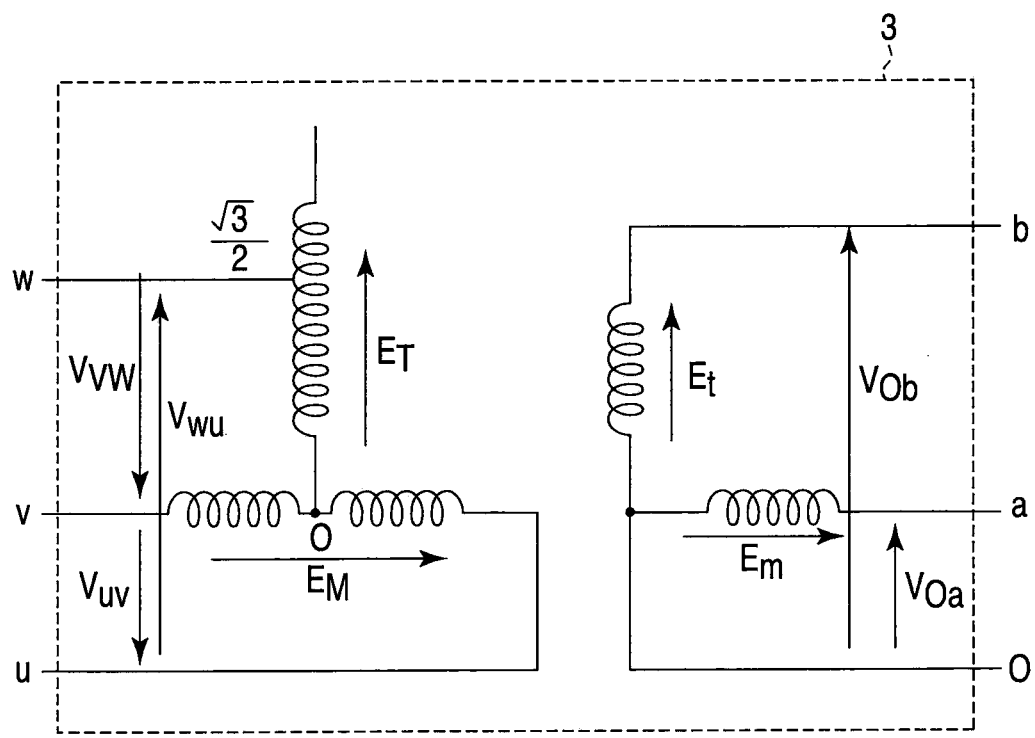
FIG. 5 is a circuit diagram illustrating voltage vectors in the Scott connection transformer according to the first embodiment of the present invention.
Figure 6:
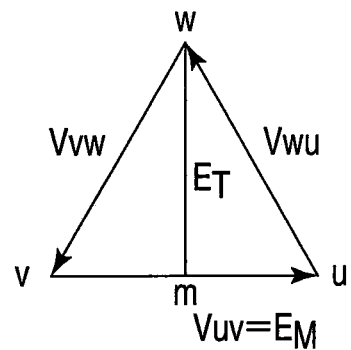
FIG. 6 is a vector diagram illustrating voltage vectors at the primary side in the Scott connection transformer according to the first embodiment of the present invention.
Figure 7:
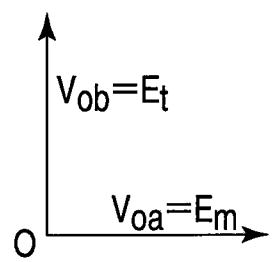
FIG. 7 is a vector diagram illustrating voltage vectors at the secondary side in the Scott connection transformer according to the first embodiment of the present invention.

FIG. 5 is a circuit diagram illustrating voltage vectors in the Scott connection transformer 3 according to the present embodiment. FIG. 6 is a vector diagram illustrating voltage vectors at the primary side of the Scott connection transformer 3 according to the present embodiment. FIG. 7 is a vector diagram illustrating voltage vectors at the secondary side of the Scott connection transformer 3 according to the present embodiment.

Figure 8:
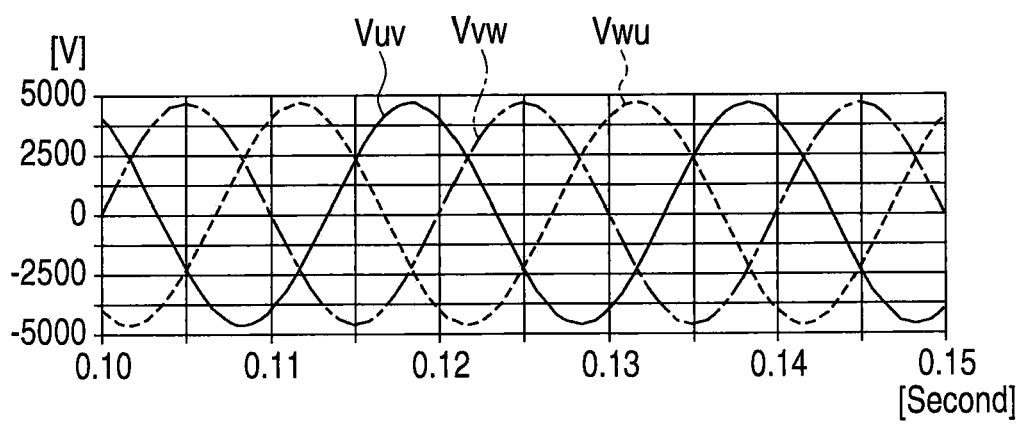
FIG. 8 is a waveform chart illustrating voltage waveforms of primary line-to-line voltages in the Scott connection transformer according to the first embodiment of the present invention.
Figure 9:
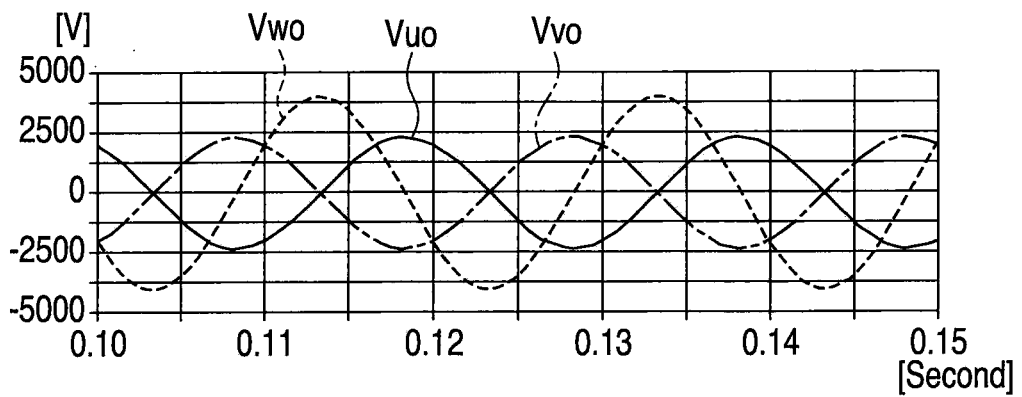
FIG. 9 is a waveform chart illustrating voltage waveforms of primary winding voltages with respect to a middle point in the Scott connection transformer according to the first embodiment of the present invention.
Figure 10:
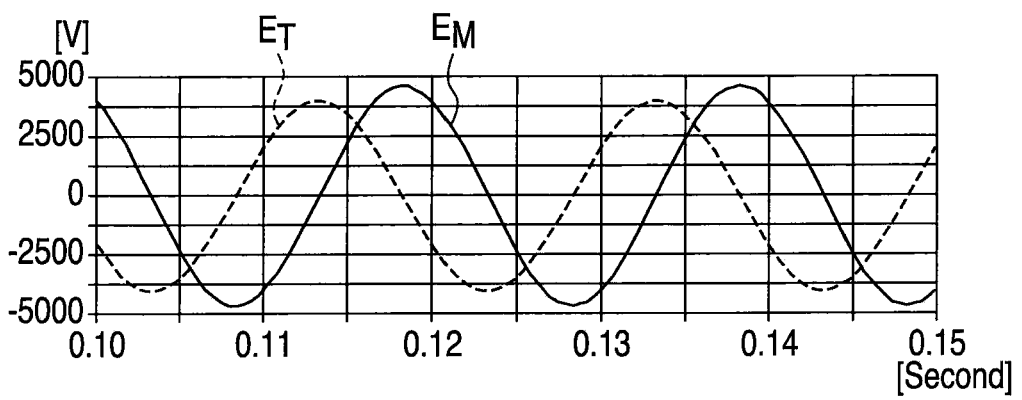
FIG. 10 is a waveform chart illustrating voltage waveforms of primary winding voltages in the Scott connection transformer according to the first embodiment of the present invention.
Figure 11:
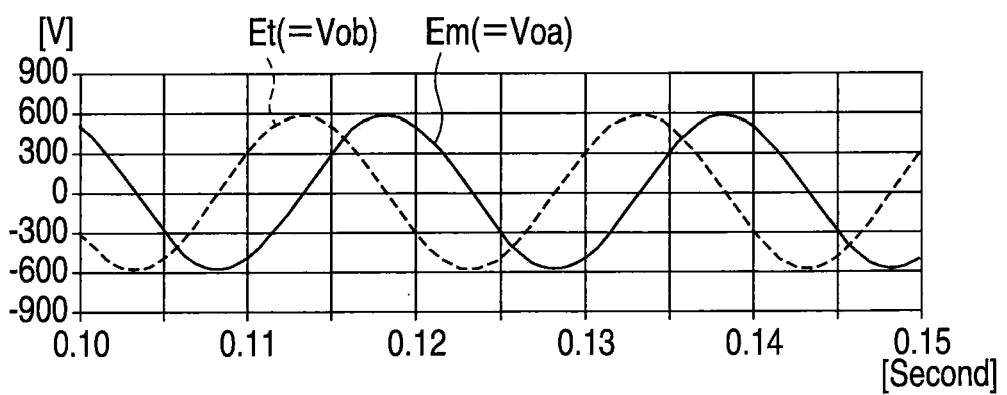
FIG. 11 is a waveform chart illustrating voltage waveforms of secondary winding voltages in the Scott connection transformer according to the first embodiment of the present invention.

FIGS. 8 to 11 are waveform charts illustrating voltage waveforms of the Scott connection transformer 3 according to the present embodiment. FIG. 8 illustrates voltage waveforms of primary line-to-line voltages Vuv, Vvw, Vwu. FIG. 9 illustrates voltage waveforms of primary winding voltages Vuo, Vvo, Vwo with respect to the middle point O. FIG. 10 illustrates voltage waveforms of primary winding voltages ET, EM. FIG. 11 illustrates voltage waveforms of secondary winding voltages Et, Em.

In the figures, the voltage Vuv denotes a line-to-line voltage between the U-phase and V-phase at the primary side of the Scott connection transformer 3. The voltage Vvw denotes a line-to-line voltage between the V-phase and W-phase at the primary side of the Scott connection transformer 3. The voltage Vwu denotes a line-to-line voltage between W-phase and U-phase at the primary side of the Scott connection transformer 3. The voltage ET denotes a primary winding voltage of the teaser transformer 301. The voltage EM denotes a primary winding voltage of the main transformer 302. The voltage Et denotes a secondary winding voltage of the teaser transformer 301. The voltage Em denotes a secondary winding voltage of the main transformer 302. The voltage Vuo denotes a primary winding voltage between the middle point O and U-phase. The voltage Vvo denotes a primary winding voltage between the middle point O and V-phase. The voltage Vwo denotes a primary winding voltage between the middle point O and W-phase.

The line-to-line voltage Vuv between the U-phase and V-phase is the same as the primary winding voltage EM of the main transformer 302. The primary winding voltage ET of the teaser transformer 301 has a phase 90 degrees fast with respect to the phase of the primary winding voltage EM of the main transformer 302. Accordingly, the secondary winding voltage Et of the teaser transformer 301 has a phase 90 degrees fast with respect to the phase of the secondary winding voltage Em of the main transformer 302.

The two pairs of single-phase alternating current voltages of the Scott connection transformer 3 are applied to terminals a-o and terminals b-o. The secondary winding voltage Em of the main transformer 302 is output from the terminals a-o. The secondary winding voltage Et of the teaser transformer 301 is output from the terminals b-o.

The configuration of the transformer inrush current suppression apparatus 6 will be explained with reference to FIGS. 1 to 3.

The transformer inrush current suppression apparatus 6 includes a power supply voltage measurement unit 601, a stable-state magnetic flux calculation unit 602, a transformer voltage measurement unit 603, a residual magnetic flux calculation unit 604, a phase detection unit 605, and a closing instruction output unit 606.

Figure 2:
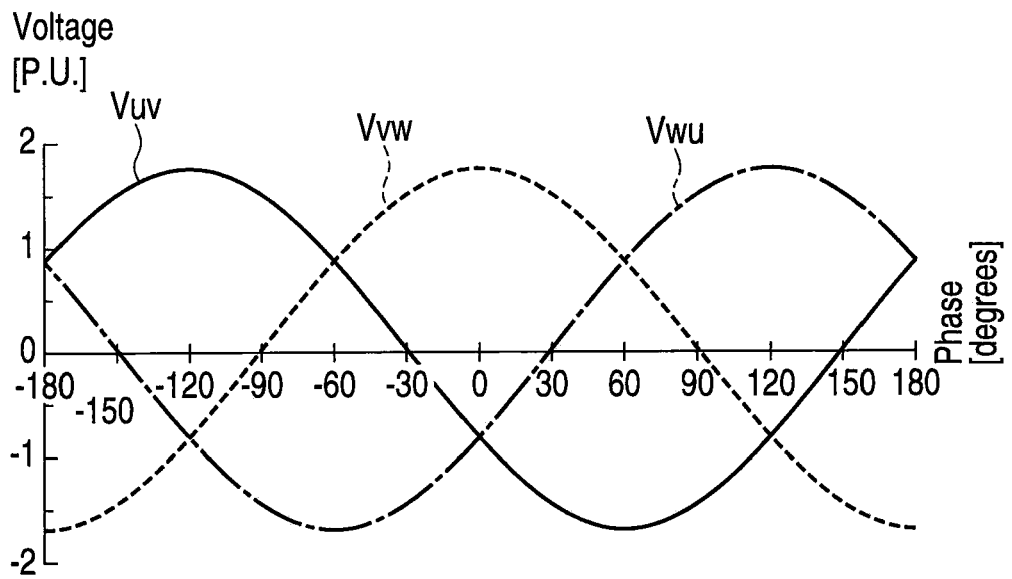
FIG. 2 is a waveform chart illustrating voltage waveforms of line-to-line voltages calculated by a stable-state magnetic flux calculation unit according to the first embodiment of the present invention.

FIG. 2 is a waveform chart illustrating voltage waveforms of line-to-line voltages Vuv, Vvw, Vwu calculated by the stable-state magnetic flux calculation unit 602 according to the present embodiment. FIG. 3 is a waveform chart illustrating magnetic flux waveforms for illustrating a closing target phase region Tc for the transformer inrush current suppression apparatus 6 according to the present embodiment.

The power supply voltage measurement unit 601 measures the phase voltages of the power supply busbar 1, based on the detection signals detected by the power supply voltage detectors 4U, 4V, 4W. The power supply voltage measurement unit 601 outputs the measured phase voltages to the stable-state magnetic flux calculation unit 602.

The stable-state magnetic flux calculation unit 602 calculates the line-to-line voltage Vuv between the U-phase and V-phase, the line-to-line voltage Vvw between the V-phase and W-phase, and the line-to-line voltage Vwu between the W-phase and U-phase, based on the phase voltages measured by the power supply voltage measurement unit 601. The stable-state magnetic flux calculation unit 602 integrates each of the calculated line-to-line voltages Vuv, Vvw, Vwu. The stable-state magnetic flux calculation unit 602 adopts these integrated values as magnetic flux in a stable state (stable-state magnetic fluxes $\phi$Tuv, $\phi$Tvw, $\phi$Twu). The stable-state magnetic flux calculation unit 602 calculates the stable-state magnetic fluxes $\phi$Tuv, $\phi$Tvw, $\phi$Twu until the circuit breaker 2 is closed. The stable-state magnetic flux calculation unit 602 outputs the calculated stable-state magnetic fluxes $\phi$Tuv, $\phi$Tvw, $\phi$Twu to the phase detection unit 605.

The transformer voltage measurement unit 603 measures the phase voltages at the primary side of the Scott connection transformer 3, based on the detection signals detected by the transformer primary side voltage detectors 5U, 5V, 5W. The transformer voltage measurement unit 603 outputs the measured phase voltages to the residual magnetic flux calculation unit 604.

The residual magnetic flux calculation unit 604 calculates the line-to-line voltages Vuv between U-phase and V-phase, the line-to-line voltages Vvw between V-phase and W-phase, and the line-to-line voltages Vwu between W-phase and U-phase immediately after the Scott connection transformer 3 is disconnected by the circuit breaker 2, based on the phase voltages measured by the transformer voltage measurement unit 603. The residual magnetic flux calculation unit 604 integrates each of the calculated line-to-line voltages Vuv, Vvw, Vwu. The residual magnetic flux calculation unit 604 adopts these integrated values as residual magnetic fluxes of the core of the Scott connection transformer 3 (primary line-to-line magnetic fluxes) $\phi$Zuv, $\phi$Zvw, $\phi$Zwu. The residual magnetic flux calculation unit 604 outputs the calculated residual magnetic fluxes $\phi$Zuv, $\phi$Zvw, $\phi$Zwu to the phase detection unit 605.

For each line-to-line, the phase detection unit 605 detects phase sections Tuv, Tvw, Twu in which the polarities of the stable-state magnetic fluxes $\phi$Tuv, $\phi$Tvw, $\phi$Twu calculated by the stable-state magnetic flux calculation unit 602 are the same as the polarities of the residual magnetic fluxes $\phi$Zuv, $\phi$Zvw, $\phi$Zwu calculated by the residual magnetic flux calculation unit 604. The phase detection unit 605 identifies a section Tc in which all of the detected phase sections Tuv, Tvw, Twu between the line-to-lines overlap each other. The identified section Tc is a closing target phase region in which the circuit breaker 2 is to be closed. The phase detection unit 605 outputs the detected closing target phase region (section) Tc to the closing instruction output unit 606.

In the closing target phase region Tc detected by the phase detection unit 605, the closing instruction output unit 606 outputs a closing instruction to an operation mechanism for driving the main contacts of the circuit breaker 2. Thus, the circuit breaker 2 is closed.

Subsequently, how the transformer inrush current is suppressed by the transformer inrush current suppression apparatus 6 will be explained with reference to FIGS. 12 to 16. In this case, in the Scott connection transformer 3, two single-phase transformers having a first rated voltage 3300 volts and a second rated voltage 415 volts are connected to the Scott connection.

FIGS. 12 and 13 are examples of states before and after the time TP at which the Scott connection transformer 3 is disconnected by the circuit breaker 2. FIG. 12 is a waveform chart illustrating the primary line-to-line voltages Vuv, Vvw, Vwu. FIG. 13 is a waveform chart illustrating the primary line-to-line magnetic fluxes $\phi$uv, $\phi$vw, $\phi$wu.

FIGS. 14 to 16 are examples of states before and after the time CL at which the Scott connection transformer 3 is energized by the circuit breaker 2 with power supplied to the power supply busbar 1. FIG. 14 is a waveform chart illustrating the primary line-to-line voltages Vuv, Vvw, Vwu. FIG. 15 is a waveform chart illustrating the primary line-to-line magnetic fluxes $\phi$uv, $\phi$vw, $\phi$wu. FIG. 16 is a waveform chart illustrating the primary side phase currents (transformer inrush current) Iu, Iv, Iw.

Suppose a three-phase voltage as shown in FIG. 12 is applied to the primary side of the Scott connection transformer 3. In this case, after the circuit breaker 2 is tripped, there remain the residual magnetic fluxes $\phi$uv, $\phi$vw, $\phi$wu after the tripping TP shown in FIG. 13.

Figure 3:
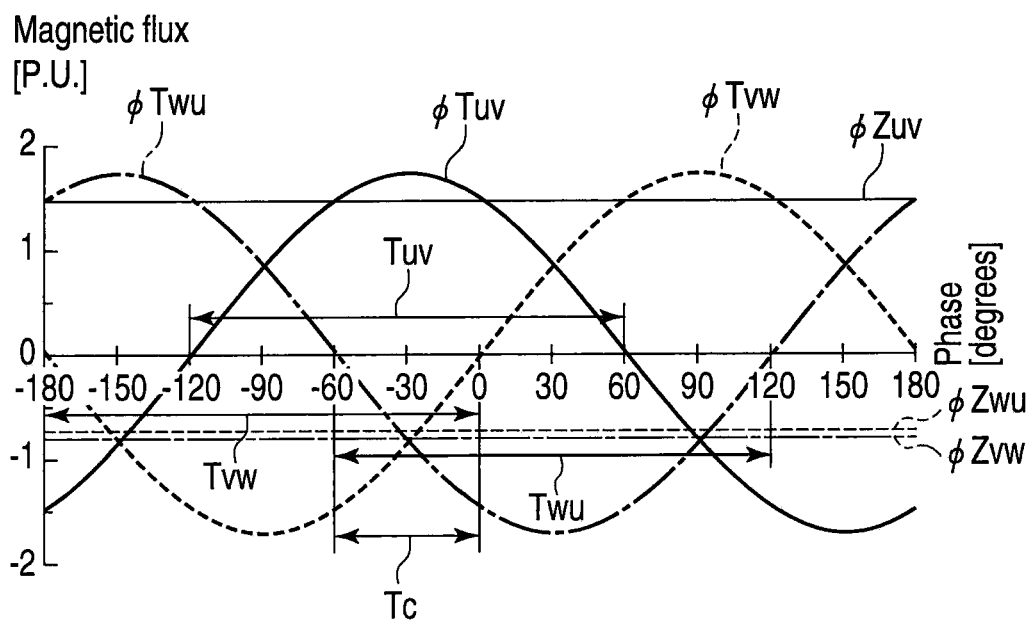
FIG. 3 is a waveform chart illustrating magnetic flux waveforms for illustrating a closing target phase region for the transformer inrush current suppression apparatus according to the first embodiment of the present invention.

When the transformer inrush current suppression apparatus 6 is used, the circuit breaker 2 is closed in the closing target phase region Tc as shown in FIG. 3. In this case, the primary line-to-line magnetic fluxes $\phi$uv, $\phi$vw, $\phi$wu shown in FIG. 15 emerge in response to the primary line-to-line voltages Vuv, Vvw, Vwu shown in FIG. 14. When this circuit breaker 2 is closed, transformer inrush currents Iu, Iv, Iw shown in FIG. 16 are generated. The maximum value of these transformer inrush currents Iu, Iv, Iw is about 200 amperes.

Subsequently, for comparison, an example of transformer inrush currents Iu, Iv, Iw will be explained with reference to FIGS. 17 to 19. In this example, the circuit breaker 2 is closed without relying on the transformer inrush current suppression apparatus 6 (i.e., the circuit breaker is not closed in the closing target phase region Tc).

Figure 18:
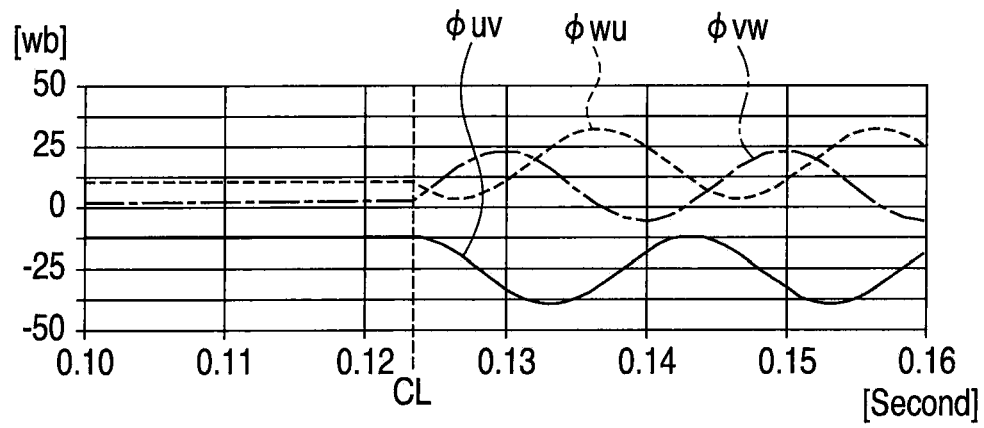
FIG. 18 is a waveform chart illustrating an example of a state of primary line-to-line magnetic fluxes before and after the time of energizing the Scott connection transformer with the conventional circuit breaker.
Figure 19:
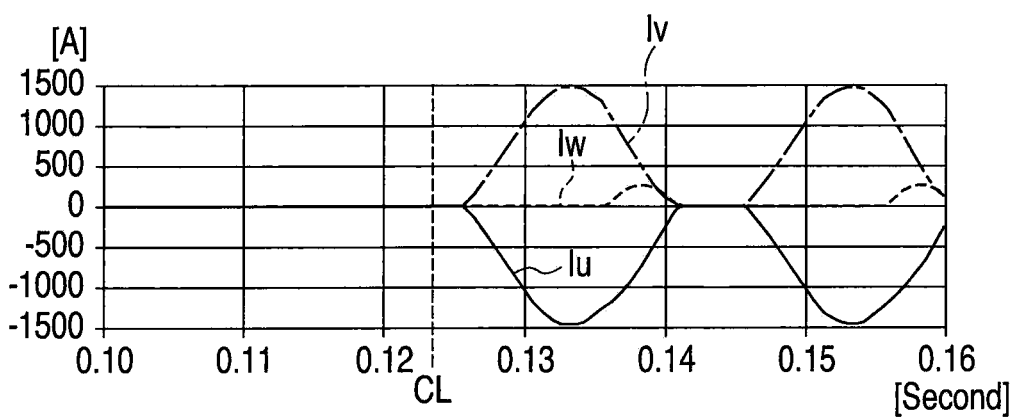
FIG. 19 is a waveform chart illustrating an example of a state of transformer inrush currents before and after energizing the Scott connection transformer with the conventional circuit breaker.

FIGS. 17 to 19 are examples of states before and after the time CL at which the Scott connection transformer 3 is energized by a conventional circuit breaker 2 with power supplied to the power supply busbar 1. FIG. 17 is a waveform chart illustrating primary line-to-line voltages Vuv, Vvw, Vwu. FIG. 18 is a waveform chart illustrating primary line-to-line magnetic fluxes φuv, φvw, φwu. FIG. 19 is a waveform chart illustrating primary side phase currents (transformer inrush currents) Iu, Iv, Iw. The conditions of FIGS. 17 to 19 are the same as the conditions shown in FIGS. 12 to 16 except for the closing phase of the circuit breaker 2.

As shown in FIG. 19, when the circuit breaker 2 is closed without causing the transformer inrush current suppression apparatus 6 to perform phase control, the maximum value of these transformer inrush currents Iu, Iv, Iw is about 1500 amperes.

According to the present embodiment, the transformer inrush current suppression apparatus 6 is used so as to close the circuit breaker 2 in the phase section in which the polarities of all the three phases of the stable-state magnetic fluxes φTuv, φTvw, φTwu are respectively the same as the polarities of the residual magnetic fluxes φZuv, φZvw, φZwu. As described above, the closing phase is controlled when the circuit breaker 2 is closed, so that the transformer inrush current can be suppressed.

First Modification of First Embodiment

In the first embodiment, the closing target phase region Tc is detected based on the stable-state magnetic fluxes φuv, φvw, φwu calculated by the stable-state magnetic flux calculation unit 602. In contrast, a transformer inrush current suppression apparatus 6 according to this modification is configured such that the closing target phase region Tc is detected based on phase voltages or line-to-line voltages measured by the power supply voltage measurement unit 601.

The transformer inrush current suppression apparatus 6 detects, as the closing target phase region Tc, a phase section in which the polarities of the phase voltages or the line-to-line voltages measured by the power supply voltage measurement unit 601 are respectively the same as the polarities of the residual magnetic fluxes φZuv, φZvw, φZwu between respective lines calculated by the residual magnetic flux calculation unit 604.

In this case, the phase difference between the line-to-line voltages and the stable-state magnetic fluxes between the lines is 90 degrees. Accordingly, the same closing target region as that of the first embodiment can be obtained by delaying the thus determined closing target phase region Tc by 90 degrees.

Regarding the comparison with the phase voltages, the phase voltages have phases 30 degrees slow with respect to those of the line-to-line voltages. In other words, the phase difference between the phase voltages and the stable-state magnetic fluxes between the lines is 60 degrees. Accordingly, the same closing target region as that of the first embodiment can be obtained by delaying the thus determined closing target phase region Tc by 60 degrees. The closing instruction output unit 606 outputs a closing instruction to the circuit breaker 2 in the detected closing target phase region Tc.

This phase difference may be set as a correction value in advance in the transformer inrush current suppression apparatus 6.

According to this modification, it is not necessary for the stable-state magnetic flux calculation unit 602 to perform calculation. Therefore, the stable-state magnetic flux calculation unit 602 can be eliminated, so that the transformer inrush current suppression apparatus 6 can perform simpler control.

Compared with the first embodiment, the transformer inrush current suppression apparatus 6 does not perform much control processing (such as calculation processing). Therefore, the circuit breaker 2 can be closed in a shorter time while suppressing the transformer inrush current.

Second Modification of First Embodiment

A transformer inrush current suppression apparatus 6 according to this modification is configured to output a closing instruction as follows.

The phase detection unit 605 detects a line-to-line having the largest residual magnetic flux from among the residual magnetic fluxes φZuv, φZvw, φZwu calculated by the residual magnetic flux calculation unit 604. A voltage zero point is detected at which the polarity of the voltage of the detected line-to-line changes from the same polarity to the opposite polarity with respect to the residual magnetic flux of the line-to-line (the largest residual magnetic flux). The phase detection unit 605 outputs the detected voltage zero point to the closing instruction output unit 606. The closing instruction output unit 606 outputs a closing instruction to the circuit breaker 2 upon adopting the voltage zero point detected by the phase detection unit 605 as a closing phase target.

According to this modification, the following actions and effects can be obtained.

As a result, the voltage zero point detected by the phase detection unit 605 resides substantially in the center of a phase section in which the polarities of all three phases of the stable-state magnetic fluxes φTuv, φTvw, φTwu are respectively the same as the polarities of the residual magnetic fluxes φZuv, φZvw, φZwu. Therefore, the same actions and effects as those of the first embodiment can be obtained.

In this modification, the voltage zero point is a zero point of the line-to-line voltage having the largest residual magnetic flux. However, in a case of a phase corresponding to the line-to-line, e.g., between U-phase and V-phase, a voltage zero point may be detected at which the phase voltage of U-phase changes from the same polarity to the opposite polarity with respect to the residual magnetic flux of the line-to-line.

The phase difference between the phase voltages and the line-to-line voltages is 30 degrees. Therefore, even when a line-to-line voltage desirably subjected to the comparison is compared instead of a phase voltage, the effect of suppressing the transformer inrush current can be obtained because the phase difference is no more than 30 degrees.

Second Embodiment

FIG. 20 is a block diagram illustrating a configuration of an electric power system including a transformer inrush current suppression apparatus 6A according to the second embodiment of the present invention.

Compared with the transformer inrush current suppression apparatus 6 according to the first embodiment shown in FIG. 1, the transformer inrush current suppression apparatus 6A is arranged with a phase detection unit 605A instead of the phase detection unit 605, and is configured to additionally include a measurement information retaining unit 607, a opening phase control unit 608, and a tripping instruction output unit 609. Other than the above, the transformer inrush current suppression apparatus 6A is the same as the transformer inrush current suppression apparatus 6 according to the first embodiment.

Before the transformer inrush current suppression apparatus 6A is operated, the measurement information retaining unit 607 measures voltage tripping phases measured by a voltage measurement unit 603 and magnetic flux signals calculated by a residual magnetic flux calculation unit 604 when a circuit breaker 2 is tripped multiple times. The measurement information retaining unit 607 retains, as measurement information, information about characteristics of the residual magnetic fluxes such as relationships between the tripping phases and the residual magnetic fluxes, based on the measured voltage tripping phases and the magnetic flux signals.

The opening phase control unit 608 receives the measurement information retained in the measurement information retaining unit 607 and phase voltages of a power supply busbar 1 measured by a power supply voltage measurement unit 601. The opening phase control unit 608 estimates residual magnetic fluxes $\phi Zuv$, $\phi Zvw$, $\phi Zwu$ of the line-to-lines from the measurement information. The opening phase control unit 608 controls the opening phase of the main contacts of the circuit breaker 2, based on the estimated residual magnetic fluxes $\phi Zuv$, $\phi Zvw$, $\phi Zwu$ and the phase voltages, so as to make the tripping phase always be the same. The opening phase control unit 608 outputs the controlled opening phase to the tripping instruction output unit 609.

The tripping instruction output unit 609 outputs a tripping instruction to the operation mechanism driving the main contacts of the circuit breaker 2, based on the opening phase received from the opening phase control unit 608. Thus, the circuit breaker 2 is tripped.

The phase detection unit 605A receives the measurement information retained in the measurement information retaining unit 607 and the stable-state magnetic fluxes $\phi Tuv$, $\phi Tvw$, $\phi Twu$ calculated by the stable-state magnetic flux calculation unit 602. The phase detection unit 605A estimates the residual magnetic fluxes $\phi Zuv$, $\phi Zvw$, $\phi Zwu$ from the measurement information retained in the measurement information retaining unit 607. The phase detection unit 605A identifies a closing target phase region Tc in which the circuit breaker 2 is closed, based on the residual magnetic fluxes $\phi Zuv$, $\phi Zvw$, $\phi Zwu$ and the stable-state magnetic fluxes $\phi Tuv$, $\phi Tvw$, $\phi Twu$. The method for identifying the closing target phase region Tc is the same as that of the first embodiment.

In this case, the opening phase control unit 608 performs phase control so as to make the tripping phase always be the same. Therefore, the phase detection unit 605A may always use the same closing target phase region Tc as long as the information retained in the measurement information retaining unit 607 is not changed (as long as the measurement information is not updated).

According to this embodiment, the following actions and effects can be obtained.

Once the circuit breaker 2, the Scott connection transformer 3, and the like are installed in the electric power system, the circuit conditions of this electric power system are always the same. Therefore, when the phase at which the circuit breaker 2 is tripped is always kept the same, the values of the residual magnetic fluxes in respective phases of the Scott connection transformer 3 should always be the same.

When the Scott connection transformer 3 is disconnected by the circuit breaker 2, the transformer inrush current suppression apparatus 6A performs tripping upon controlling the opening phase of the circuit breaker 2 so as to make the tripping phase always be the same. In other words, the transformer inrush current suppression apparatus 6A may always use the same value of the residual magnetic fluxes. Therefore, the transformer inrush current suppression apparatus 6A can always achieve the same phase when the circuit breaker 2 is closed to energize the Scott connection transformer 3. As a result, the transformer inrush current suppression apparatus 6A can always suppress the transformer inrush current.

Therefore, even when the transformer primary side voltage detectors 5U, 5V, 5W are not always connected, the transformer inrush current suppression apparatus 6A can always obtain, based on the measurement information retained in the measurement information retaining unit 607, the information about the residual magnetic fluxes of the Scott connection transformer 3 generated after the Scott connection transformer 3 is disconnected by the circuit breaker 2. Therefore, the transformer primary side voltage detectors 5U, 5V, 5W may be connected only when the measurement information retaining unit 607 performs a measurement process, so that the transformer primary side voltage detectors 5U, 5V, 5W may be detached during a normal operational state. Alternatively, the transformer primary side voltage detectors 5U, 5V, 5W may be permanently installed.

Third Embodiment

Figure 21:
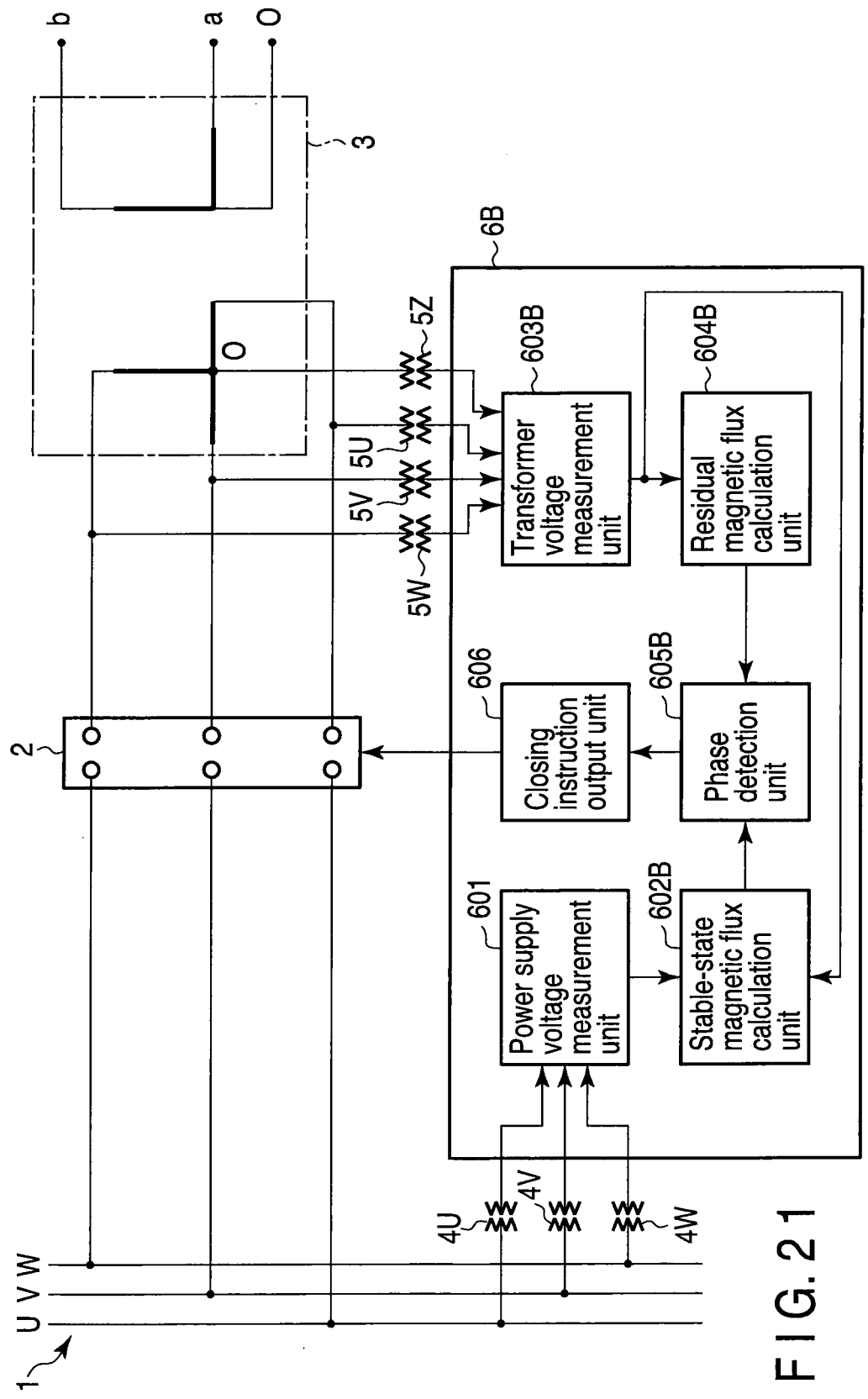
FIG. 21 is a block diagram illustrating a configuration of an electric power system including a transformer inrush current suppression apparatus according to a third embodiment of the present invention.

FIG. 21 is a block diagram illustrating a configuration of an electric power system including a transformer inrush current suppression apparatus 6B according to the third embodiment of the present invention.

Compared with the electric power system according to the first embodiment shown in FIG. 1, the electric power system according to the present embodiment is configured to additionally include a transformer primary side voltage detector 5Z.

Compared with the transformer inrush current suppression apparatus 6 according to the first embodiment as shown in FIG. 1, the transformer inrush current suppression apparatus 6B is configured such that the stable-state magnetic flux calculation unit 602 is replaced with a stable-state magnetic flux calculation unit 602B, the transformer voltage measurement unit 603 is replaced with a transformer voltage measurement unit 603B, the residual magnetic flux calculation unit 604 is replaced with a residual magnetic flux calculation unit 604B, and the phase detection unit 605 is replaced with a phase detection unit 605B. Other than the above, the transformer inrush current suppression apparatus 6B is the same as the transformer inrush current suppression apparatus 6 according to the first embodiment.

The transformer primary side voltage detector 5Z is a measurement device for measuring a voltage to the ground at a middle point O of the primary winding of a Scott connection transformer 3. The transformer primary side voltage detector 5Z is, for example, a voltage transformer. The transformer primary side voltage detector 5Z outputs a detection value, as a detection signal, to the transformer inrush current suppression apparatus 6B.

The transformer voltage measurement unit 603B measures the voltage to the ground at the middle point O and phase voltages at the primary side of the Scott connection transformer 3, based on the detection signals detected by the transformer primary side voltage detectors 5U, 5V, 5W, 5Z. The transformer voltage measurement unit 603B outputs the measured voltage to the ground at the middle point O and the measured phase voltages to the residual magnetic flux calculation unit 604B. The transformer voltage measurement unit 603B outputs the measured voltage to the ground at the middle point O to the stable-state magnetic flux calculation unit 602B.

The stable-state magnetic flux calculation unit 602B calculates winding voltages Vuo, Vvo, Vwo at the primary side of the Scott connection transformer 3, based on the voltage to the ground at the middle point O measured by the transformer voltage measurement unit 603B and the phase voltages measured by the power supply voltage measurement unit 601 while a three-phase alternating current voltage is applied to the Scott connection transformer 3 in a stable state. The winding voltages Vuo, Vvo, Vwo are obtained by subtracting the voltage to the ground at the middle point O from the phase voltages. The stable-state magnetic flux calculation unit 602B integrates each of the calculated winding voltages Vuo, Vvo, Vwo. The stable-state magnetic flux calculation unit 602B adopts these integrated values as stable-state magnetic fluxes $\phi$Tuo, $\phi$Tvo, $\phi$Two of the winding voltages. The stable-state magnetic flux calculation unit 602B outputs the calculated stable-state magnetic fluxes $\phi$Tuo, $\phi$Tvo, $\phi$Two to the phase detection unit 605B.

The residual magnetic flux calculation unit 604B calculates the winding voltages Vuo, Vvo, Vwo at the primary side of the Scott connection transformer 3 occurring immediately after the Scott connection transformer 3 is disconnected by the circuit breaker 2, based on the voltage to the ground at the middle point O and the phase voltages measured by the transformer voltage measurement unit 603B. The residual magnetic flux calculation unit 604B integrates each of the calculated winding voltages Vuo, Vvo, Vwo. The residual magnetic flux calculation unit 604B adopts the integrated values as residual magnetic fluxes $\phi$Zuo, $\phi$Zvo, $\phi$Zwo of the windings at the primary side of the Scott connection transformer 3. The residual magnetic flux calculation unit 604B outputs the calculated residual magnetic fluxes $\phi$Zuo, $\phi$Zvo, $\phi$Zwo to the phase detection unit 605B.

The phase detection unit 605B receives the stable-state magnetic fluxes $\phi$Tuo, $\phi$Tvo, $\phi$Two calculated by the stable-state magnetic flux calculation unit 602B and the residual magnetic fluxes $\phi$Zuo, $\phi$Zvo, $\phi$Zwo calculated by the residual magnetic flux calculation unit 604B. For each primary winding magnetic flux, the phase detection unit 605B detects a phase section in which the stable-state magnetic fluxes $\phi$Tuo, $\phi$Tvo, $\phi$Two calculated by the stable-state magnetic flux calculation unit 602B are substantially the same as the residual magnetic fluxes $\phi$Zuo, $\phi$Zvo, $\phi$Zwo calculated by the residual magnetic flux calculation unit 604B. This phase section may be a section in which the polarities of the stable-state magnetic fluxes $\phi$Tuo, $\phi$Tvo, $\phi$Two are respectively the same as the polarities of the residual magnetic fluxes $\phi$Zuo, $\phi$Zvo, $\phi$Zwo, or may be a section in which the polarity of any one of the primary winding magnetic fluxes is substantially the same as the polarity of the corresponding residual magnetic flux. The phase detection unit 605B outputs the detected phase section, as the closing target phase region Tc, to the closing instruction output unit 606.

In the closing target phase region Tc detected by the phase detection unit 605B, the closing instruction output unit 606 outputs a closing instruction to the operation mechanism for driving the main contacts of the circuit breaker 2. Thus, the circuit breaker 2 is closed.

Subsequently, how the transformer inrush current is suppressed by the transformer inrush current suppression apparatus 6B will be explained with reference to FIGS. 22 to 24.

Figure 22:
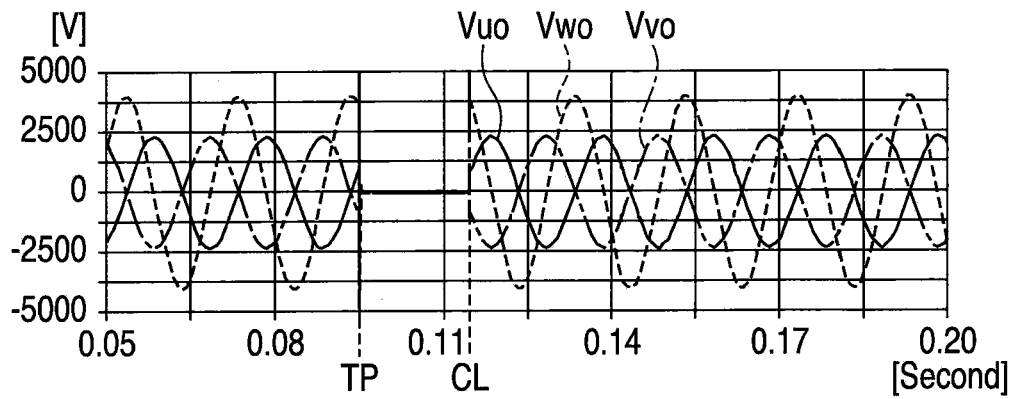
FIG. 22 is a waveform chart illustrating an example of a state of primary winding voltages from tripping to closing with a transformer inrush current suppression apparatus according to the third embodiment of the present invention.
Figure 23:
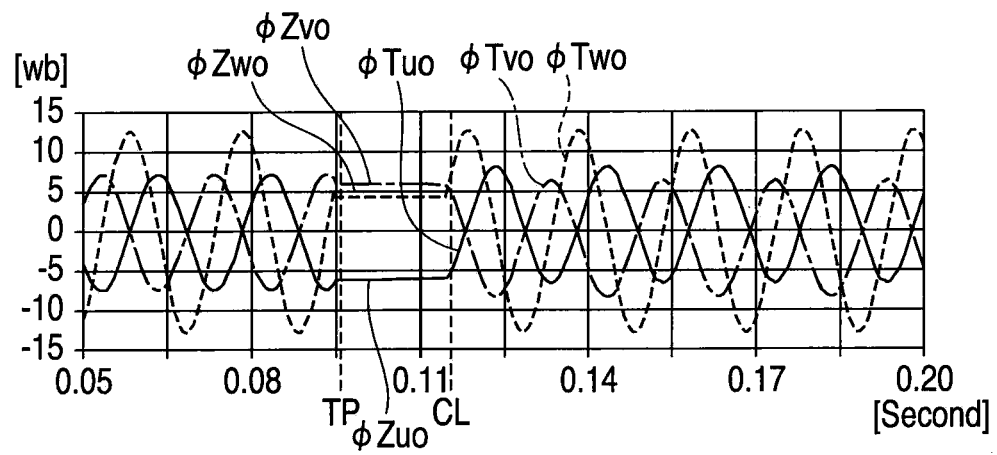
FIG. 23 is a waveform chart illustrating an example of a state of primary winding magnetic fluxes from tripping to closing with a transformer inrush current suppression apparatus according to the third embodiment of the present invention.
Figure 24:
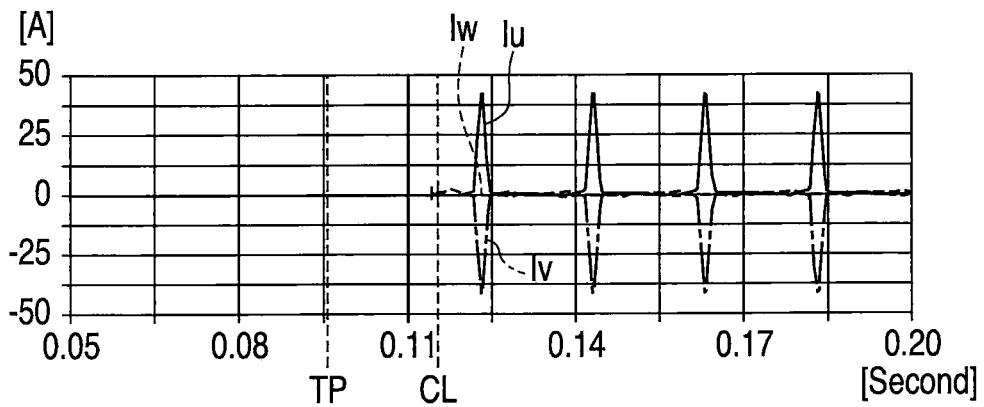
FIG. 24 is a waveform chart illustrating an example of a state of transformer inrush currents from tripping to closing with a transformer inrush current suppression apparatus according to the third embodiment of the present invention.

FIGS. 22 to 24 illustrate an example of a state from disconnecting (tripping of the circuit breaker 2) TP to energizing (closing of the circuit breaker 2) CL of the Scott connection transformer 3 with the circuit breaker 2. FIG. 22 is a waveform chart illustrating primary winding voltages Vuo, Vvo, Vwo. FIG. 23 illustrates a waveform chart illustrating primary winding magnetic fluxes (stable-state magnetic fluxes $\phi$Tuo, $\phi$Tvo, $\phi$Two and residual magnetic fluxes $\phi$Zuo, $\phi$Zvo, $\phi$Zwo). FIG. 24 is a waveform chart illustrating transformer inrush currents Iu, Iv, Iw.

When the primary winding voltages Vuo, Vvo, Vwo shown in FIG. 22 are applied to the primary side of the Scott connection transformer 3, there remain the residual magnetic fluxes $\phi$Zuo, $\phi$Zvo, $\phi$Zwo shown in FIG. 23 after the time TP at which the circuit breaker 2 is tripped.

When the circuit breaker 2 is closed using the transformer inrush current suppression apparatus 6B, the transformer inrush currents Iu, Iv, Iw are suppressed as shown in FIG. 24.

According to the present embodiment, primary winding voltages Vuo, Vvo, Vwo can be measured by measuring the voltage to the ground at the middle point O of the main transformer 302. As a result, the stable-state magnetic fluxes $\phi$Tuo, $\phi$Tvo, $\phi$Two and the residual magnetic fluxes $\phi$Zuo, $\phi$Zvo, $\phi$Zwo of the respective windings can be calculated. Therefore, based on the magnetic flux of each winding of the Scott connection transformer 3, the transformer inrush current suppression apparatus 6B can suppress the transformer inrush current generated when the circuit breaker 2 is closed.

Fourth Embodiment

FIG. 25 is a block diagram illustrating a configuration of an electric power system including a transformer inrush current suppression apparatus 6C according to the fourth embodiment of the present invention.

Compared with the transformer inrush current suppression apparatus 6B according to the third embodiment shown in FIG. 21, the transformer inrush current suppression apparatus 6C is arranged with a phase detection unit 605C instead of the phase detection unit 605B, and additionally includes a measurement information retaining unit 607C, a opening phase control unit 608C, and a tripping instruction output unit 609. Other than the above, the transformer inrush current suppression apparatus 6C is the same as the transformer inrush current suppression apparatus 6B according to the third embodiment.

Before the transformer inrush current suppression apparatus 6C is operated, the measurement information retaining unit 607C measures voltage tripping phases measured by the transformer voltage measurement unit 603B and magnetic flux signals calculated by the residual magnetic flux calculation unit 604B when the circuit breaker 2 is tripped multiple times. The measurement information retaining unit 607C retains, as measurement information, information about characteristics of the residual magnetic fluxes such as relationships between the tripping phases and the residual magnetic fluxes, based on the measured voltage tripping phases and the magnetic flux signals.

The opening phase control unit 608C receives the measurement information retained in the measurement information retaining unit 607C and phase voltages of the power supply busbar 1 measured by the power supply voltage measurement unit 601. The opening phase control unit 6080 estimates the residual magnetic fluxes $\phi$Zuo, $\phi$Zvo, $\phi$Zwo of the respective windings from the measurement information. The opening phase control unit 6080 controls the opening phase of the main contacts of the circuit breaker 2, based on the estimated residual magnetic fluxes $\phi$Zuo, $\phi$Zvo, $\phi$Zwo and the phase voltages, so as to make the tripping phase always be the same. The opening phase control unit 608C outputs the controlled opening phase to the tripping instruction output unit 609.

The tripping instruction output unit 609 outputs a tripping instruction to the operation mechanism driving the main contacts of the circuit breaker 2, based on the opening phase received from the opening phase control unit 608C. Thus, the circuit breaker 2 is tripped.

The phase detection unit 605C receives the measurement information retained in the measurement information retaining unit 607 and the stable-state magnetic fluxes φTuo, φTvo, φTwo calculated by the stable-state magnetic flux calculation unit 602B. The phase detection unit 605C estimates the residual magnetic fluxes φZuo, φZvo, φZwo from the measurement information retained in the measurement information retaining unit 607C. The phase detection unit 605C identifies a closing target phase region Tc in which the circuit breaker 2 is closed, based on the residual magnetic fluxes φZuo, φZvo, φZwo and the stable-state magnetic fluxes φTuo, φTvo, φTwo. The method for identifying the closing target phase region Tc is the same as that of the third embodiment.

In this case, the opening phase control unit 608C performs phase control so as to make the tripping phase always be the same. Therefore, the phase detection unit 605C may always use the same closing target phase region Tc as long as the information retained in the measurement information retaining unit 607C is not changed (as long as the measurement information is not updated).

According to this embodiment, the same actions and effects as those of the third embodiment and the second embodiment can be obtained.

Fifth Embodiment

Figure 26:
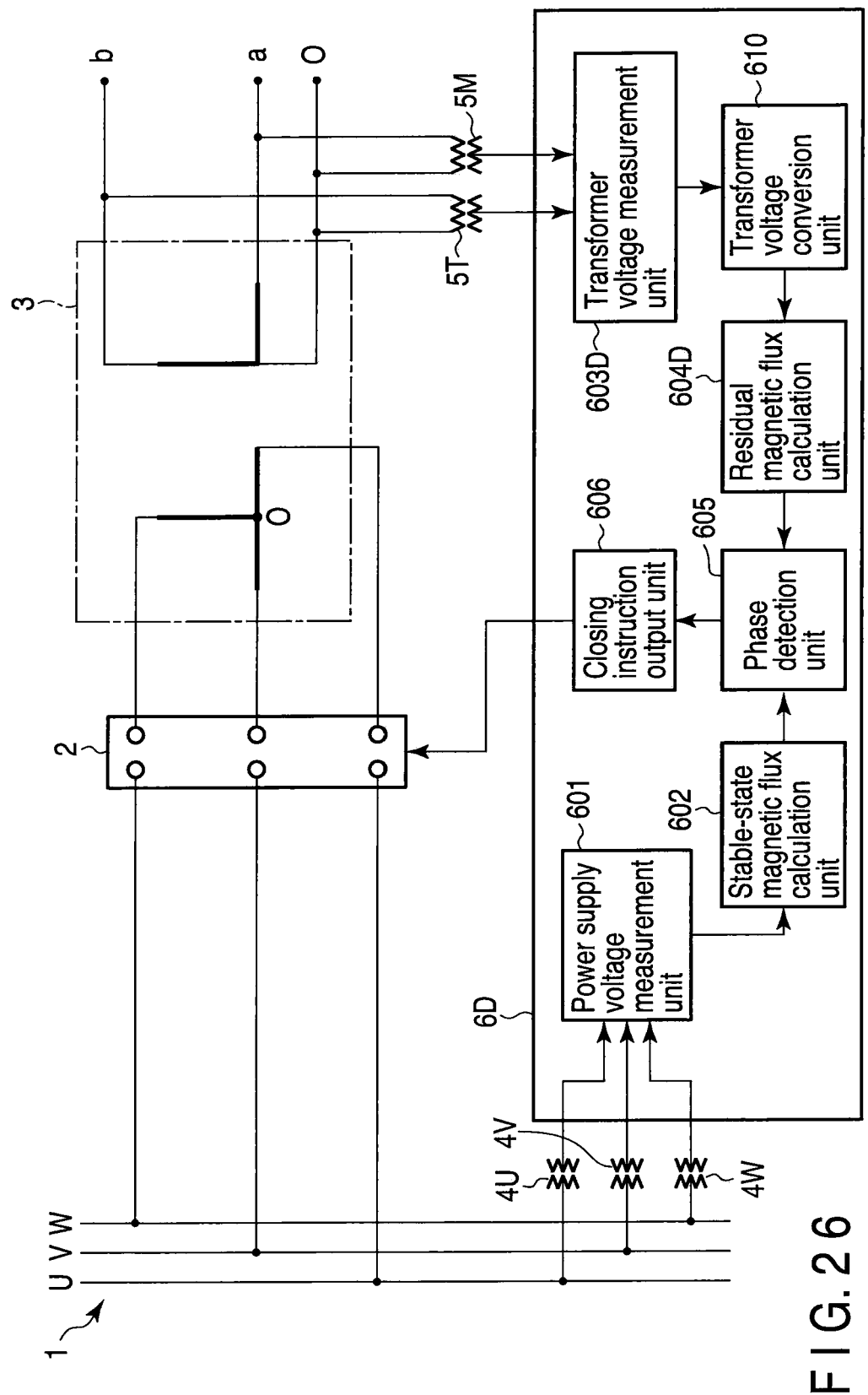
FIG. 26 is a block diagram illustrating a configuration of an electric power system including a transformer inrush current suppression apparatus according to a fifth embodiment of the present invention.

FIG. 26 is a block diagram illustrating a configuration of an electric power system including a transformer inrush current suppression apparatus 6D according to the fifth embodiment of the present invention.

Compared with the electric power system according to the first embodiment shown in FIG. 1, the electric power system according to the present embodiment is arranged with transformer secondary side voltage detectors 5T, 5M instead of the transformer primary side voltage detectors 5U, 5V, 5W.

Compared with the transformer inrush current suppression apparatus 6 according to the first embodiment shown in FIG. 1, the transformer inrush current suppression apparatus 6D is arranged with a transformer voltage measurement unit 603D instead of the transformer voltage measurement unit 603, and a residual magnetic flux calculation unit 604D instead of the residual magnetic flux calculation unit 604. In addition, the transformer inrush current suppression apparatus 6D has a transformer voltage conversion unit 610. Other than the above, the transformer inrush current suppression apparatus 6D is the same as the transformer inrush current suppression apparatus 6 according to the first embodiment.

The transformer voltage measurement unit 603D measures two pairs of single-phase alternating current voltages Vt, Vm at the secondary side of the Scott connection transformer 3, based on the detection signals detected by the transformer secondary side voltage detectors 5T, 5M. The single-phase alternating current voltage Vm is the secondary winding voltage (voltage between terminals a-o) of the main transformer 302. The single-phase alternating current voltage Vt is a secondary winding voltage (voltage between terminals b-o) of the teaser transformer 301. The transformer voltage measurement unit 603 outputs the measured two pairs of single-phase alternating current voltages Vt, Vm to the transformer voltage conversion unit 610.

The transformer voltage conversion unit 610 uses the following expressions to convert the two pairs of single-phase alternating current voltages Vt, Vm measured by the transformer voltage measurement unit 603D into primary side line-to-line voltages VDuv, VDvw, VDwu. The primary side line-to-line voltage VDuv is a converted line-to-line voltage between the U-phase and V-phase. The primary side line-to-line voltage VDvw is a converted line-to-line voltage between the V-phase and W-phase. The primary side line-to-line voltage VDwu is a converted line-to-line voltage between the W-phase and U-phase. The transformer voltage conversion unit 610 outputs the converted primary side line-to-line voltages VDuv, VDvw, VDwu to the residual magnetic flux calculation unit 604D.

$$VDuv = Vm \tag{1}$$

$$VDvw = -(\sqrt{3}/2)Vt - (1/2)Vm \tag{2}$$

$$VDwu = (\sqrt{3}/2)Vt - (1/2)Vm \tag{3}$$

The calculation processing performed by the transformer voltage conversion unit 610 according to the present embodiment will be explained with reference to FIGS. 27 to 29.

Figure 27:
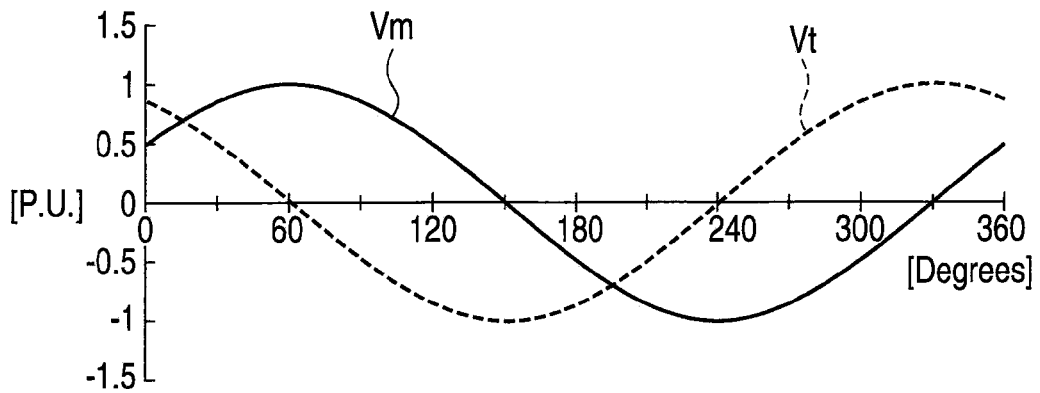
FIG. 27 is a waveform chart illustrating voltage waveforms of two pairs of single-phase alternating current voltages measured by a transformer voltage measurement unit according to the fifth embodiment of the present invention.

FIG. 27 is a waveform chart illustrating voltage waveforms of the two pairs of single-phase alternating current voltages Vt, Vm measured by the transformer voltage measurement unit 603D. FIG. 28 is a waveform chart illustrating voltage waveforms of primary side line-to-line voltages VDuv, VDvw, VDwu converted by the transformer voltage conversion unit 610. FIG. 29 is a waveform chart illustrating voltage waveforms of primary side line-to-line voltages Vuv, Vvw, Vwu of the Scott connection transformer 3.

Figure 28:
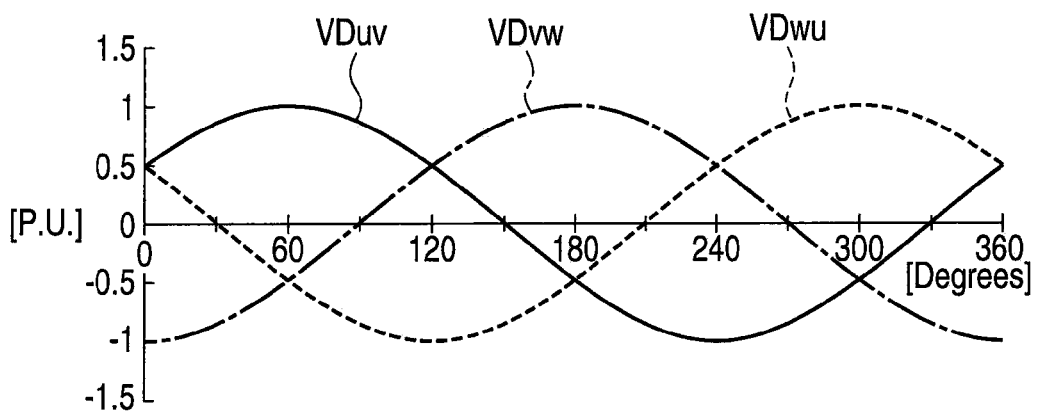
FIG. 28 is a waveform chart illustrating voltage waveforms of primary side line-to-line voltages converted by a transformer voltage conversion unit according to the fifth embodiment of the present invention.
Figure 29:
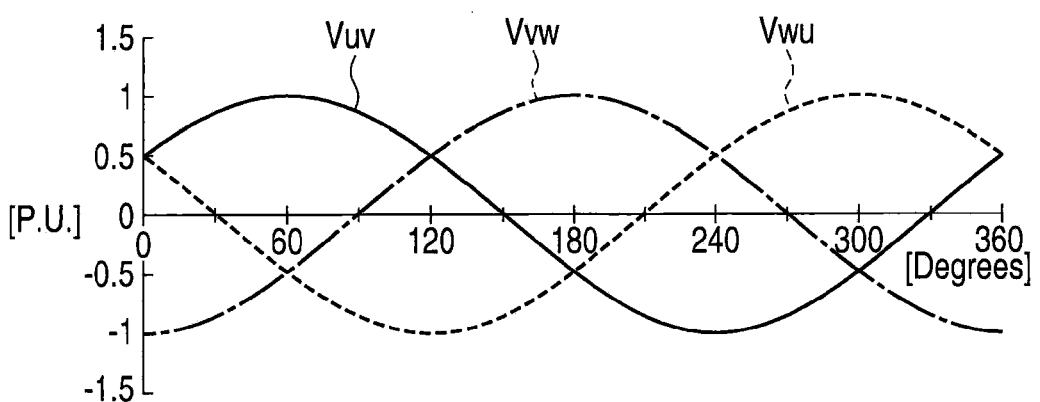
FIG. 29 is a waveform chart illustrating voltage waveforms of primary side line-to-line voltages of a Scott connection transformer according to the fifth embodiment of the present invention.

The transformer voltage conversion unit 610 converts the two pairs of single-phase alternating current voltages Vt, Vm shown in FIG. 27 into primary side line-to-line voltages VDuv, VDvw, VDwu shown in FIG. 28. As a result, the transformer voltage conversion unit 610 can obtain the same voltage waveforms as those of the line-to-line voltages Vuv, Vvw, Vwu applied to the primary side of the Scott connection transformer 3 shown in FIG. 29.

The residual magnetic flux calculation unit 604D integrates each of the line-to-line voltages VDuv, VDvw, VDwu converted by the transformer voltage conversion unit 610, immediately after the Scott connection transformer 3 is disconnected by the circuit breaker 2. The residual magnetic flux calculation unit 604D adopts these integrated values as residual magnetic fluxes (primary line-to-line magnetic fluxes) φZuv, φZvw, φZwu of the core of the Scott connection transformer 3. The residual magnetic flux calculation unit 604D outputs the calculated residual magnetic fluxes φZuv, φZvw, φZwu to the phase detection unit 605.

Like the first embodiment, the phase detection unit 605 identifies a closing target phase region Tc based on the stable-state magnetic fluxes φTuv, φTvw, φTwu calculated by the stable-state magnetic flux calculation unit 602 and the residual magnetic fluxes φZuv, φZvw, φZwu calculated by the residual magnetic flux calculation unit 604D.

According to the present embodiment, even when only the transformer secondary side voltage detectors 5T, 5M are installed in the Scott connection transformer 3, the secondary voltages Vt, Vm of the Scott connection transformer 3 are converted into the primary line-to-line voltages VDuv, VDvw, VDwu, whereby the same actions and effects as those of the first embodiment can be obtained.

Sixth Embodiment

Figure 30:
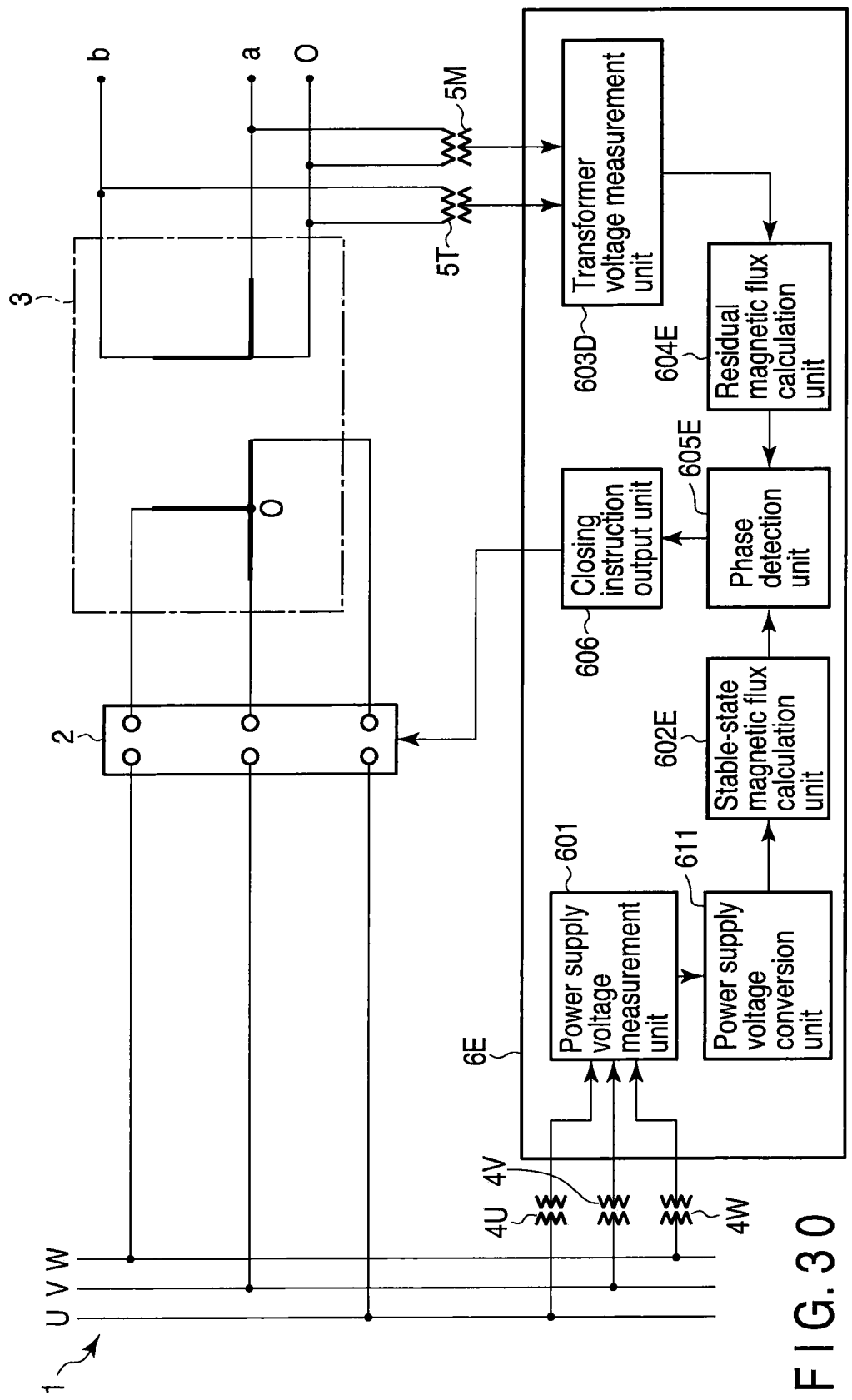
FIG. 30 is a block diagram illustrating a configuration of an electric power system including a transformer inrush current suppression apparatus according to a sixth embodiment of the present invention.

FIG. 30 is a block diagram illustrating a configuration of an electric power system including a transformer inrush current suppression apparatus 6E according to the sixth embodiment of the present invention.

Compared with the transformer inrush current suppression apparatus 6D according to the fifth embodiment shown in FIG. 26, a transformer inrush current suppression apparatus 6E is configured such that a power supply voltage conversion unit 611 is arranged instead of the transformer voltage conversion unit 610, a stable-state magnetic flux calculation unit 602E is arranged instead of the stable-state magnetic flux calculation unit 602, a residual magnetic flux calculation unit 604E is arranged instead of the residual magnetic flux calculation unit 604D, and a phase detection unit 605E is arranged instead of the phase detection unit 605. Other than the above, the transformer inrush current suppression apparatus 6E is the same as the transformer inrush current suppression apparatus 6D according to the fifth embodiment.

The residual magnetic flux calculation unit 604E integrates each of the two pairs of single-phase alternating current voltages Vt, Vm measured by the transformer voltage measurement unit 603D, immediately after the Scott connection transformer 3 is disconnected by the circuit breaker 2. The residual magnetic flux calculation unit 604E adopts these integrated values as residual magnetic fluxes (secondary winding magnetic fluxes) φZm, φZt of the core of the Scott connection transformer 3. The residual magnetic flux φZm is residual magnetic flux of the secondary winding of the main transformer 302. The residual magnetic flux φZt is residual magnetic flux of the secondary winding of the teaser transformer 301. The residual magnetic flux calculation unit 604E outputs the calculated residual magnetic fluxes φZm, φZt to the phase detection unit 605E.

The power supply voltage conversion unit 611 calculates line-to-line voltages Vuv, Vvw, Vwu based on phase voltages measured by the power supply voltage measurement unit 601. The power supply voltage conversion unit 611 uses the following expressions to convert the calculated line-to-line voltages Vuv, Vvw, Vwu into primary winding voltages VDm, VDt of the Scott connection transformer 3. The primary winding voltage VDm is a converted primary winding voltage of the main transformer 302. The primary winding voltage VDt is a converted primary winding voltage of the teaser transformer 301. The power supply voltage conversion unit 611 outputs the converted primary winding voltages VDm, VDt of the Scott connection transformer 3 to the stable-state magnetic flux calculation unit 602E.

$$VDm = (\sqrt{3}/2)Vuv \quad (4)$$

$$VDt = (Vwu - Vvw)/2 \quad (5)$$

The calculation processing performed by the power supply voltage conversion unit 611 according to the present embodiment will be explained with reference to FIGS. 31 to 33.

Figure 31:
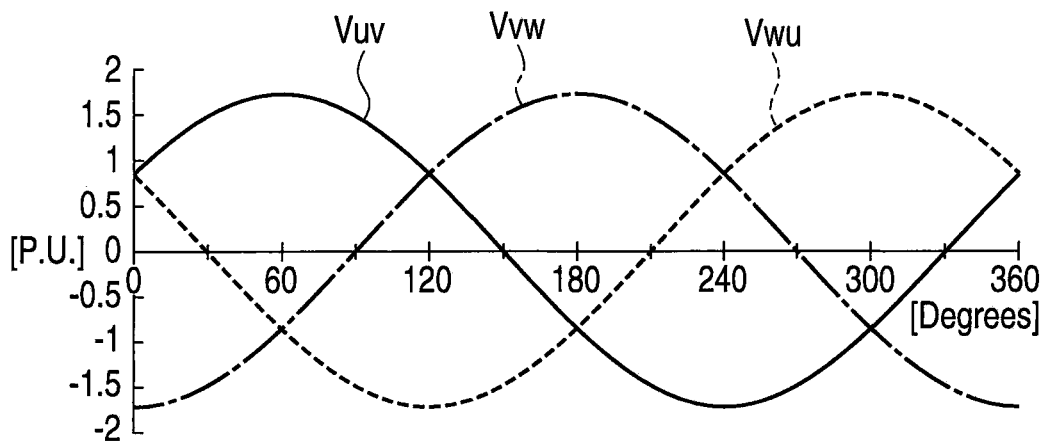
FIG. 31 is a waveform chart illustrating voltage waveforms of line-to-line voltages calculated by a power supply voltage conversion unit according to the sixth embodiment of the present invention.

FIG. 31 is waveform chart illustrating voltage waveforms of the line-to-line voltages Vuv, Vvw, Vwu calculated by the power supply voltage conversion unit 611. FIG. 32 is a waveform chart illustrating voltage waveforms of primary winding voltages VDm, VDt of the Scott connection transformer 3 converted by the power supply voltage conversion unit 611. FIG. 33 is a waveform chart illustrating voltage waveforms of secondary voltages Vm, Vt of the Scott connection transformer 3.

Figure 32:
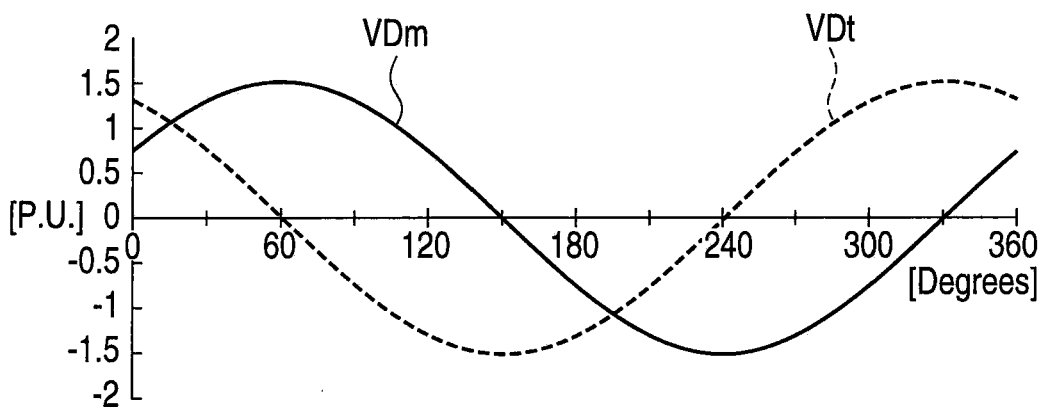
FIG. 32 is a waveform chart illustrating voltage waveforms of primary winding voltages in the Scott connection transformer converted by the power supply voltage conversion unit according to the sixth embodiment of the present invention.
Figure 33:
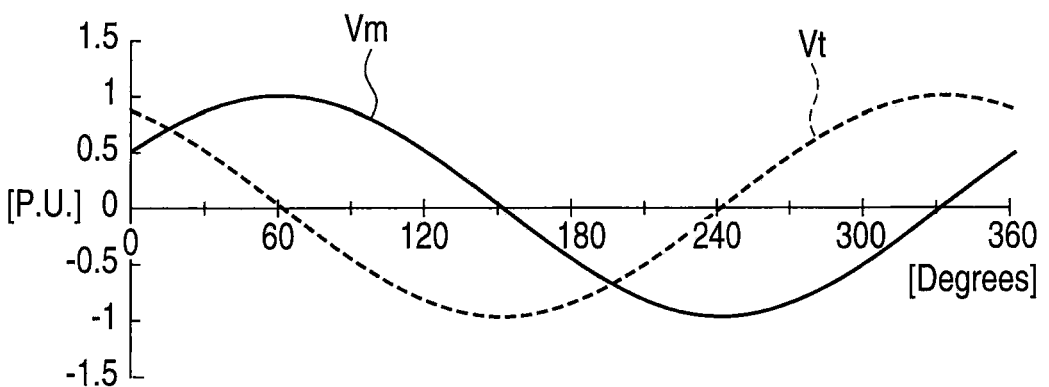
FIG. 33 is a waveform chart illustrating voltage waveforms of secondary voltages in the Scott connection transformer according to the sixth embodiment of the present invention.

The power supply voltage conversion unit 611 converts the line-to-line voltages Vuv, Vvw, Vwu shown in FIG. 31 into the primary winding voltages VDm, VDt of the Scott connection transformer 3 shown in FIG. 32. The converted primary winding voltages VDm, VDt have a waveform whose cycle and phase are the same as those of the voltage waveforms of the secondary voltages Vm, Vt of the Scott connection transformer 3 shown in FIG. 33. Therefore, in use, the primary winding voltages VDm, VDt converted by the power supply voltage conversion unit 611 are deemed to be secondary voltages for calculating stable-state magnetic fluxes φTm, φTt of the respective windings at the secondary side of the Scott connection transformer 3.

The stable-state magnetic flux calculation unit 602E integrates each of primary winding voltages (voltages deemed to be secondary voltages) VDm, VDt converted by the power supply voltage conversion unit 611. The stable-state magnetic flux calculation unit 602E adopts these integrated values as stable-state magnetic fluxes (secondary winding magnetic fluxes) φTm, φTt of the core of the Scott connection transformer 3. The stable-state magnetic flux calculation unit 602E outputs the calculated stable-state magnetic fluxes φTm, φTt to the phase detection unit 605E.

The phase detection unit 605E receives the stable-state magnetic fluxes φTm, φTt calculated by the stable-state magnetic flux calculation unit 602E and the residual magnetic fluxes φZm, φZt calculated by the residual magnetic flux calculation unit 604E. For each secondary winding magnetic flux, the phase detection unit 605E detects a phase section in which the stable-state magnetic fluxes φTm, φTt calculated by the stable-state magnetic flux calculation unit 602E are substantially the same as the residual magnetic fluxes φZm, φZt calculated by the residual magnetic flux calculation unit 604E, respectively. This phase section may be a section in which the polarities of the stable-state magnetic fluxes φTm, φTt are respectively the same as the polarities of the residual magnetic fluxes φZm, φZt, or may be a section in which the polarity of any one of the secondary winding magnetic fluxes is substantially the same as the polarity of the corresponding residual magnetic flux. The phase detection unit 605 outputs the detected phase section, as the closing target phase region Tc, to the closing instruction output unit 606.

In the closing target phase region Tc detected by the phase detection unit 605E, the closing instruction output unit 606 outputs a closing instruction to the operation mechanism for driving the main contacts of the circuit breaker 2. Thus, the circuit breaker 2 is closed.

Subsequently, how the transformer inrush current is suppressed by the transformer inrush current suppression apparatus 6E will be explained with reference to FIGS. 34 to 36.

FIGS. 34 to 36 illustrate an example of a state from tripping TP to closing CL of the Scott connection transformer 3 with the circuit breaker 2. FIG. 34 is a waveform chart illustrating the secondary voltages Vm, Vt. FIG. 35 is a waveform chart illustrating the secondary winding magnetic fluxes (the stable-state magnetic fluxes φTm, φTt and the residual magnetic fluxes φZm, φZt). FIG. 36 is a waveform chart illustrating transformer inrush currents Iu, Iv, Iw.

When the secondary voltages Vm, Vt shown in FIG. 34 are applied to the secondary side of the Scott connection transformer 3, there remain the residual magnetic fluxes φZm, φZt shown in FIG. 35 after the time TP at which the circuit breaker 2 is tripped.

When the circuit breaker 2 is closed using the transformer inrush current suppression apparatus 6E, the transformer inrush currents Iu, Iv, Iw are suppressed as shown in FIG. 36.

According to the present embodiment, the stable-state magnetic fluxes φTm, φTt of the secondary winding magnetic fluxes of the Scott connection transformer 3 can be obtained from the line-to-line voltages Vuv, Vvw, Vwu of the power supply busbar 1. Therefore, the closing target phase region Tc for closing the circuit breaker 2 can be identified by measuring the secondary voltages of the Scott connection transformer 3 and obtaining residual magnetic fluxes φZm, φZt.

Therefore, even when only the transformer secondary side voltage detectors 5T, 5M are installed in the Scott connection transformer 3, the phase control can be performed to suppress the transformer inrush currents Iu, Iv, Iw.

Seventh Embodiment

Figure 37:
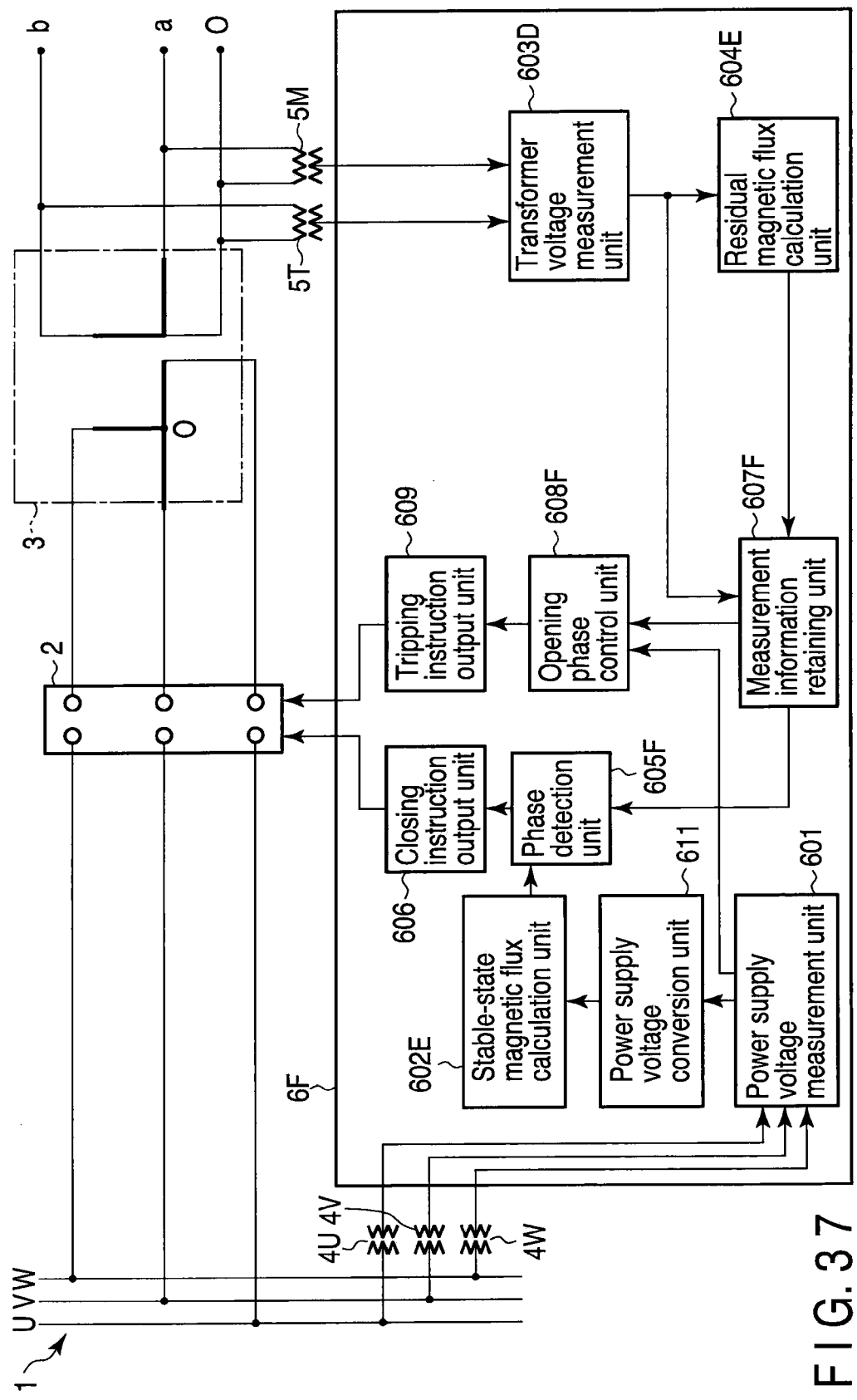
FIG. 37 is a block diagram illustrating a configuration of an electric power system including a transformer inrush current suppression apparatus according to a seventh embodiment of the present invention.

FIG. 37 is a block diagram illustrating a configuration of an electric power system including a transformer inrush current suppression apparatus 6F according to the seventh embodiment of the present invention.

Compared with the transformer inrush current suppression apparatus 6E according to the sixth embodiment shown in FIG. 30, the transformer inrush current suppression apparatus 6F is arranged with a phase detection unit 605F instead of the phase detection unit 605E, and additionally includes a measurement information retaining unit 607F, a opening phase control unit 608F, and a tripping instruction output unit 609. Other than the above, the transformer inrush current suppression apparatus 6F is the same as the transformer inrush current suppression apparatus 6E according to the sixth embodiment.

Before the transformer inrush current suppression apparatus 6F is operated, the measurement information retaining unit 607F measures voltage tripping phases measured by a voltage measurement unit 603D and magnetic flux signals calculated by a residual magnetic flux calculation unit 604E when a circuit breaker 2 is tripped multiple times. The measurement information retaining unit 607F retains, as measurement information, information about characteristics of the residual magnetic fluxes such as relationships between the tripping phases and the residual magnetic fluxes, based on the measured voltage tripping phases and the magnetic flux signals.

The opening phase control unit 608F receives the measurement information retained in the measurement information retaining unit 607F and phase voltages of a power supply busbar 1 measured by a power supply voltage measurement unit 601. The opening phase control unit 608F estimates residual magnetic fluxes $\phi Zm$, $\phi Zt$ of the secondary windings of the Scott connection transformer 3 from the measurement information. The opening phase control unit 608F controls the opening phase of the main contacts of the circuit breaker 2, based on the estimated residual magnetic fluxes $\phi Zm$, $\phi Zt$ and the phase voltages, so as to make the tripping phase always be the same. The opening phase control unit 608F outputs the controlled opening phase to the tripping instruction output unit 609.

The tripping instruction output unit 609 outputs a tripping instruction to the operation mechanism driving the main contacts of the circuit breaker 2, based on the opening phase received from the opening phase control unit 608F. Thus, the circuit breaker 2 is tripped.

The phase detection unit 605F receives the measurement information retained in the measurement information retaining unit 607F and the stable-state magnetic fluxes $\phi Tm$, $\phi Tt$ of the secondary winding magnetic fluxes of the Scott connection transformer 3 calculated by the stable-state magnetic flux calculation unit 602E. The phase detection unit 605F estimates the residual magnetic fluxes $\phi Zm$, $\phi Zt$ from the measurement information retained in the measurement information retaining unit 607F. The phase detection unit 605F identifies a closing target phase region Tc in which the circuit breaker 2 is closed, based on the residual magnetic fluxes $\phi Zm$, $\phi Zt$ and the stable-state magnetic fluxes $\phi Tm$, $\phi Tt$. The method for identifying the closing target phase region Tc is the same as that of the sixth embodiment.

In this case, the opening phase control unit 608F performs phase control so as to make the tripping phase always be the same. Therefore, the phase detection unit 605F may always use the same closing target phase region Tc as long as the information retained in the measurement information retaining unit 607F is not changed (as long as the measurement information is not updated).

According to this embodiment, the same actions and effects as those of the sixth embodiment and the second embodiment can be obtained.

In each of the above embodiments, the transformer having the Scott connection has been explained as the transformer for converting the three-phase alternating current voltage into the single-phase alternating current voltages. However, transformers having other connections may also be used. The above embodiments may also be applied to a modified Woodbridge connection transformer, and to transformers having other connections as long as they have magnetic fluxes characteristics similar to those of the Scott connection transformer.

In each of the above embodiments, the power supply voltage detectors 4U, 4V, 4W are used to measure the phase voltages of the power supply busbar 1. However, the line-to-line voltages of the power supply busbar 1 may be measured instead. The same configuration as the above embodiments can be obtained by performing calculation processing for converting the phase voltages into the line-to-line voltages.

Further, in each of the above embodiments, various parameters in the phase control used in the transformer inrush current suppression apparatus 6 and the like may be corrected in order to, for example, further enhance the accuracy. For example, when the circuit breaker 2 is closed, closing times vary due to electric discharge called pre-arching occurring between the main contacts and variation in the operation of the operation mechanism. The characteristics of the closing variation caused by the pre-arching and the variation of the closing times of the circuit breaker may be obtained in advance, and the phase control may be corrected based on the obtained characteristics. By performing such correction, the transformer inrush current can be reliably suppressed even when the above variations occur.

In each of the above embodiments, when the stable-state magnetic fluxes and the residual magnetic fluxes are calculated, the magnetic fluxes are obtained upon converting the voltages, for example, from phase voltages into line-to-line voltages and from line-to-line voltages to various kinds of winding voltages. Alternatively, the magnetic fluxes may be converted after the magnetic fluxes are obtained. For example, when the line-to-line magnetic fluxes are obtained from respective phase voltages, the magnetic fluxes of respective phases may be obtained first and thereafter the line-to-line magnetic fluxes may be obtained. Regarding other calculations, the order of calculation and the location of calculation (a computer and various detectors regardless of whether they are arranged in or outside the transformer inrush current suppression apparatus) may be changed as necessary as long as the same results are obtained.

Further, in each of the above embodiments, the circuit breaker 2 is a three-phase collective-operation circuit breaker. However, it may be a separate phase operation circuit breaker in which each phase is operated separately. When the separate phase operation circuit breaker is used, the same actions and effects as those of the three-phase collective-operation circuit breaker can be obtained by operating the circuit breaker of respective phases at a time.

In the third embodiment and the fourth embodiment, the stable-state magnetic fluxes $\phi Tuo$, $\phi Tvo$, $\phi Two$ and the residual magnetic fluxes φZuo, φZvo, φZwo are compared in all the primary windings of the Scott connection transformer 3, and the closing phase of the circuit breaker 2 is controlled. Alternatively, a simpler configuration may be employed as explained below.

In the case of the Scott connection, the primary winding voltage Vwo of the teaser transformer 301 is larger than the primary winding voltages Vuo, Vvo of the main transformer 302. The two primary winding voltages Vuo, Vvo of the main transformer 302 have the same magnitude but have opposite polarities. Therefore, the transformer inrush current suppression apparatuses 6B, 6C can be configured to compare the stable-state magnetic flux and the residual magnetic flux with each other, only with respect to one of the two primary windings of the main transformer 302 and the primary winding of the teaser transformer 301.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transformer inrush current suppression apparatus for suppressing a transformer inrush current of a circuit breaker which makes and breaks connection between an electric power system for a three-phase alternating current, including a power supply and a transformer which converts a three-phase alternating current voltage into a single-phase alternating current voltage, comprising:
    a transformer side three-phase alternating current voltage measurement unit which measures the three-phase alternating current voltage at a side of the transformer with respect to the circuit breaker;
    a residual magnetic flux calculation unit which calculates three line-to-line residual magnetic fluxes of the transformer generated after the transformer is disconnected by the circuit breaker, based on the three-phase alternating current voltage measured by the transformer side three-phase alternating current voltage measurement unit;
    a power supply side three-phase alternating current voltage measurement unit which measures a three-phase alternating current voltage at a side of the power supply with respect to the circuit breaker;
    a stable-state magnetic flux calculation unit which calculates three line-to-line stable-state magnetic fluxes of the transformer, based on the three-phase alternating current voltage measured by the power supply side three-phase alternating current voltage measurement unit;
    a phase determination unit which determines a phase in which phases of the three line-to-line stable-state magnetic fluxes calculated by the stable-state magnetic flux calculation unit are respectively the same in polarity as phases of the three line-to-line residual magnetic fluxes calculated by the residual magnetic flux calculation unit; and
    a closing unit which closes the circuit breaker in the phase determined by the phase determination unit.

2. The transformer inrush current suppression apparatus according to claim 1, further comprising:
    a measurement information retaining unit which retains information obtained by measuring a tripping phase of the circuit breaker and the residual magnetic flux of the transformer when the circuit breaker is tripped for at least one time; and
    a tripping unit which trips the circuit breaker in the same tripping phase, based on the information retained in the measurement information retaining unit,
    wherein the closing unit closes the circuit breaker based on the tripping phase used by the tripping unit.

3. The transformer inrush current suppression apparatus according to claim 2, wherein the circuit breaker is a three-phase collective-operation circuit breaker which collectively operates contacts for three phases.

4. The transformer inrush current suppression apparatus according to claim 2, wherein the circuit breaker is a separate phase operation circuit breaker which separately operates a contact for each phase, and
    the contacts of three phases are closed or opened at a time.

5. The transformer inrush current suppression apparatus according to claim 1, wherein the circuit breaker is a three-phase collective-operation circuit breaker which collectively operates contacts for three phases.

6. The transformer inrush current suppression apparatus according to claim 1, wherein the circuit breaker is a separate phase operation circuit breaker which separately operates a contact for each phase, and
    the contacts of three phases are closed or opened at a time.

7. A transformer inrush current suppression apparatus for suppressing a transformer inrush current of a circuit breaker which makes and breaks connection between an electric power system for a three-phase alternating current, including a power supply and a transformer which converts a three-phase alternating current voltage into a single-phase alternating current voltage, comprising:
    a transformer side three-phase alternating current voltage measurement unit which measures the three-phase alternating current voltage at a side of the transformer with respect to the circuit breaker;
    a residual magnetic flux calculation unit which calculates three line-to-line residual magnetic fluxes of the transformer generated after the transformer is disconnected by the circuit breaker, based on the three-phase alternating current voltage measured by the transformer side three-phase alternating current voltage measurement unit;
    a line-to-line detection unit which detects a line-to-line having the largest residual magnetic flux from among the three line-to-line residual magnetic fluxes calculated by the residual magnetic flux calculation unit;
    a power supply side three-phase alternating current voltage measurement unit which measures a three-phase alternating current voltage at a side of the power supply with respect to the circuit breaker;
    a stable-state magnetic flux calculation unit which calculates three line-to-line stable-state magnetic fluxes of the transformer, based on the three-phase alternating current voltage measured by the power supply side three-phase alternating current voltage measurement unit;
    a phase determination unit which determines a phase of a voltage zero point at which, in the line-to-line detected by the line-to-line detection unit, a polarity of a line-to-line voltage based on the three-phase alternating current voltage measured by the power supply side three-phase alternating current voltage measurement unit changes from the same polarity to the opposite polarity with respect to a polarity of the line-to-line stable-state magnetic flux calculated by the stable-state magnetic flux calculation unit; and a closing unit which closes the circuit breaker in the phase determined by the phase determination unit.

8. The transformer inrush current suppression apparatus according to claim 7, further comprising:

a measurement information retaining unit which retains information obtained by measuring a tripping phase of the circuit breaker and the residual magnetic flux of the transformer when the circuit breaker is tripped for at least one time; and a tripping unit which trips the circuit breaker in the same tripping phase, based on the information retained in the measurement information retaining unit, wherein the closing unit closes the circuit breaker based on the tripping phase used by the tripping unit.

9. The transformer inrush current suppression apparatus according to claim 8, wherein the circuit breaker is a three-phase collective-operation circuit breaker which collectively operates contacts for three phases.

10. The transformer inrush current suppression apparatus according to claim 8, wherein the circuit breaker is a separate phase operation circuit breaker which separately operates a contact for each phase, and the contacts of three phases are closed or opened at a time.

11. The transformer inrush current suppression apparatus according to claim 7, wherein the circuit breaker is a three-phase collective-operation circuit breaker which collectively operates contacts for three phases.

12. The transformer inrush current suppression apparatus according to claim 7, wherein the circuit breaker is a separate phase operation circuit breaker which separately operates a contact for each phase, and the contacts of three phases are closed or opened at a time.

13. A transformer inrush current suppression apparatus for suppressing a transformer inrush current of a circuit breaker which makes and breaks connection between an electric power system for a three-phase alternating current, including a power supply and a transformer which converts a three-phase alternating current voltage into a single-phase alternating current voltage, comprising:

a transformer side single-phase alternating current voltage measurement unit which measures a single-phase alternating current voltage of the transformer;

a transformer side voltage conversion unit which converts the single-phase alternating current voltage of the transformer measured by the transformer side single-phase alternating current voltage measurement unit into the three-phase alternating current voltage of the transformer;

a residual magnetic flux calculation unit which calculates three line-to-line residual magnetic fluxes of the transformer generated after the transformer is disconnected by the circuit breaker, based on the three-phase alternating current voltage converted by the transformer side voltage conversion unit;

a power supply side three-phase alternating current voltage measurement unit which measures a three-phase alternating current voltage at a side of the power supply with respect to the circuit breaker;

a stable-state magnetic flux calculation unit which calculates three line-to-line stable-state magnetic fluxes of the transformer, based on the three-phase alternating current voltage measured by the power supply side three-phase alternating current voltage measurement unit;

a phase determination unit which determines a phase in which phases of the three line-to-line stable-state magnetic fluxes calculated by the stable-state magnetic flux calculation unit are respectively the same in polarity as phases of the three line-to-line residual magnetic fluxes calculated by the residual magnetic flux calculation unit; and a closing unit which closes the circuit breaker in the phase determined by the phase determination unit.

14. The transformer inrush current suppression apparatus according to claim 13, further comprising:

a measurement information retaining unit which retains information obtained by measuring a tripping phase of the circuit breaker and the residual magnetic flux of the transformer when the circuit breaker is tripped for at least one time; and a tripping unit which trips the circuit breaker in the same tripping phase, based on the information retained in the measurement information retaining unit, wherein the closing unit closes the circuit breaker based on the tripping phase used by the tripping unit.

15. The transformer inrush current suppression apparatus according to claim 14, wherein the circuit breaker is a three-phase collective-operation circuit breaker which collectively operates contacts for three phases.

16. The transformer inrush current suppression apparatus according to claim 14, wherein the circuit breaker is a separate phase operation circuit breaker which separately operates a contact for each phase, and the contacts of three phases are closed or opened at a time.

17. The transformer inrush current suppression apparatus according to claim 13, wherein the circuit breaker is a three-phase collective-operation circuit breaker which collectively operates contacts for three phases.

18. The transformer inrush current suppression apparatus according to claim 13, wherein the circuit breaker is a separate phase operation circuit breaker which separately operates a contact for each phase, and the contacts of three phases are closed or opened at a time.

19. A transformer inrush current suppression apparatus for suppressing a transformer inrush current of a circuit breaker which makes and breaks connection between an electric power system for a three-phase alternating current, including a power supply and a transformer which converts a three-phase alternating current voltage into a single-phase alternating current voltage, comprising:

a transformer side single-phase alternating current voltage measurement unit which measures a single-phase alternating current voltage of the transformer;

a transformer side voltage conversion unit which converts the single-phase alternating current voltage of the transformer measured by the transformer side single-phase alternating current voltage measurement unit into the three-phase alternating current voltage of the transformer;

a residual magnetic flux calculation unit which calculates three line-to-line residual magnetic fluxes of the transformer generated after the transformer is disconnected by the circuit breaker, based on the three-phase alternating current voltage converted by the transformer side voltage conversion unit;

a line-to-line detection unit which detects a line-to-line having the largest residual magnetic flux from among the three line-to-line residual magnetic fluxes calculated by the residual magnetic flux calculation unit;

a power supply side three-phase alternating current voltage measurement unit which measures a three-phase alternating current voltage at a side of the power supply with respect to the circuit breaker;

a stable-state magnetic flux calculation unit which calculates three line-to-line stable-state magnetic fluxes of the transformer, based on the three-phase alternating current voltage measured by the power supply side three-phase alternating current voltage measurement unit;

a phase determination unit which determines a phase of a voltage zero point at which, in the line-to-line detected by the line-to-line detection unit, a polarity of a line-to-line voltage based on the three-phase alternating current voltage converted by the transformer side voltage conversion unit changes from the same polarity to the opposite polarity with respect to a polarity of the three line-to-line stable-state magnetic fluxes calculated by the stable-state magnetic flux calculation unit; and a closing unit which closes the circuit breaker in the phase determined by the phase determination unit.

20. The transformer inrush current suppression apparatus according to claim 19, further comprising:

a measurement information retaining unit which retains information obtained by measuring a tripping phase of the circuit breaker and the residual magnetic flux of the transformer when the circuit breaker is tripped for at least one time; and a tripping unit which trips the circuit breaker in the same tripping phase, based on the information retained in the measurement information retaining unit, wherein the closing unit closes the circuit breaker based on the tripping phase used by the tripping unit.

21. The transformer inrush current suppression apparatus according to claim 20, wherein the circuit breaker is a three-phase collective-operation circuit breaker which collectively operates contacts for three phases.

22. The transformer inrush current suppression apparatus according to claim 20, wherein the circuit breaker is a separate phase operation circuit breaker which separately operates a contact for each phase, and the contacts of three phases are closed or opened at a time.

23. The transformer inrush current suppression apparatus according to claim 19, wherein the circuit breaker is a three-phase collective-operation circuit breaker which collectively operates contacts for three phases.

24. The transformer inrush current suppression apparatus according to claim 19, wherein the circuit breaker is a separate phase operation circuit breaker which separately operates a contact for each phase, and the contacts of three phases are closed or opened at a time.

25. A transformer inrush current suppression apparatus for suppressing a transformer inrush current of a circuit breaker which makes and breaks connection between an electric power system for a three-phase alternating current, including a power supply and a transformer which converts a three-phase alternating current voltage into a single-phase alternating current voltage, comprising:

a transformer side single-phase alternating current voltage measurement unit which measures a single-phase alternating current voltage of the transformer;

a residual magnetic flux calculation unit which calculates residual magnetic flux of a winding at a side of the single-phase alternating current of the transformer generated after the transformer is disconnected by the circuit breaker, based on the single-phase alternating current voltage measured by the transformer side single-phase alternating current voltage measurement unit;

a power supply side three-phase alternating current voltage measurement unit which measures a three-phase alternating current voltage at a side of the power supply with respect to the circuit breaker;

a power supply side voltage conversion unit which converts the three-phase alternating current voltage measured by the power supply side three-phase alternating current voltage measurement unit into the single-phase alternating current voltage of the transformer;

a stable-state magnetic flux calculation unit which calculates stable-state magnetic flux of a winding at a side of the single-phase alternating current of the transformer, based on the single-phase alternating current voltage converted by the power supply side voltage conversion unit;

a phase determination unit which determines a phase in which a phase of the stable-state magnetic flux of the winding at the side of the single-phase alternating current calculated by the stable-state magnetic flux calculation unit is the same as a phase of the residual magnetic flux of the winding at the side of the single-phase alternating current calculated by the residual magnetic flux calculation unit; and a closing unit which closes the circuit breaker in the phase determined by the phase determination unit.

26. The transformer inrush current suppression apparatus according to claim 25, further comprising:

a measurement information retaining unit which retains information obtained by measuring a tripping phase of the circuit breaker and the residual magnetic flux of the transformer when the circuit breaker is tripped for at least one time; and a tripping unit which trips the circuit breaker in the same tripping phase, based on the information retained in the measurement information retaining unit, wherein the closing unit closes the circuit breaker based on the tripping phase used by the tripping unit.

27. The transformer inrush current suppression apparatus according to claim 26, wherein the circuit breaker is a three-phase collective-operation circuit breaker which collectively operates contacts for three phases.

28. The transformer inrush current suppression apparatus according to claim 26, wherein the circuit breaker is a separate phase operation circuit breaker which separately operates a contact for each phase, and the contacts of three phases are closed or opened at a time.

29. The transformer inrush current suppression apparatus according to claim 25, wherein the circuit breaker is a three-phase collective-operation circuit breaker which collectively operates contacts for three phases.

30. The transformer inrush current suppression apparatus according to claim 25, wherein the circuit breaker is a separate phase operation circuit breaker which separately operates a contact for each phase, and the contacts of three phases are closed or opened at a time.

31. A transformer inrush current suppression apparatus for suppressing a transformer inrush current of a circuit breaker which makes and breaks connection between an electric power system for a three-phase alternating current, including a power supply and a Scott connection transformer including a main transformer and a teaser transformer, comprising:

a transformer side three-phase alternating current voltage measurement unit which measures a three-phase alternating current voltage at a side of the Scott connection transformer with respect to the circuit breaker;

a middle point voltage measurement unit which measures a voltage to a ground at a middle point of the main transformer;

a residual magnetic flux calculation unit which calculates residual magnetic flux of a primary winding of the Scott connection transformer generated after the Scott connection transformer is disconnected by the circuit breaker, based on the voltage to the ground at the middle point measured by the middle point voltage measurement unit and the three-phase alternating current voltage measured by the transformer side three-phase alternating current voltage measurement unit;

a power supply side three-phase alternating current voltage measurement unit which measures a three-phase alternating current voltage at a side of the power supply with respect to the circuit breaker;

a stable-state magnetic flux calculation unit which calculates stable-state magnetic flux of a primary winding of the Scott connection transformer, based on the voltage to the ground at the middle point measured by the middle point voltage measurement unit and the three-phase alternating current voltage measured by the power supply side three-phase alternating current voltage measurement unit;

a phase determination unit which determines a phase in which the stable-state magnetic flux of the primary winding calculated by the stable-state magnetic flux calculation unit is the same as the residual magnetic flux of the primary winding calculated by the residual magnetic flux calculation unit; and a closing unit which closes the circuit breaker in the phase determined by the phase determination unit.

32. The transformer inrush current suppression apparatus according to claim 31, further comprising:

a measurement information retaining unit which retains information obtained by measuring a tripping phase of the circuit breaker and the residual magnetic flux of the Scott connection transformer when the circuit breaker is tripped for at least one time; and a tripping unit which trips the circuit breaker in the same tripping phase, based on the information retained in the measurement information retaining unit, wherein the closing unit closes the circuit breaker based on the tripping phase used by the tripping unit.

33. The transformer inrush current suppression apparatus according to claim 32, wherein the circuit breaker is a three-phase collective-operation circuit breaker which collectively operates contacts for three phases.

34. The transformer inrush current suppression apparatus according to claim 32, wherein the circuit breaker is a separate phase operation circuit breaker which separately operates a contact for each phase, and the contacts of three phases are closed or opened at a time.

35. The transformer inrush current suppression apparatus according to claim 31, wherein the circuit breaker is a three-phase collective-operation circuit breaker which collectively operates contacts for three phases.

36. The transformer inrush current suppression apparatus according to claim 31, wherein the circuit breaker is a separate phase operation circuit breaker which separately operates a contact for each phase, and the contacts of three phases are closed or opened at a time.

37. A transformer inrush current suppression method for suppressing a transformer inrush current of a circuit breaker which makes and breaks connection between an electric power system for a three-phase alternating current, including a power supply and a transformer which converts a three-phase alternating current voltage into a single-phase alternating current voltage, the method comprising:

measuring the three-phase alternating current voltage at a side of the transformer with respect to the circuit breaker;

calculating three line-to-line residual magnetic fluxes of the transformer generated after the transformer is disconnected by the circuit breaker, based on the measured three-phase alternating current voltage at the side of the transformer;

measuring a three-phase alternating current voltage at a side of the power supply with respect to the circuit breaker;

calculating three line-to-line stable-state magnetic fluxes of the transformer, based on the measured three-phase alternating current at the side of the power supply;

determining a phase in which phases of the calculated three line-to-line stable-state magnetic fluxes are respectively the same in polarity as phases of the calculated three line-to-line residual magnetic fluxes; and closing the circuit breaker in the determined phase.

38. The transformer inrush current suppression method according to claim 37, further comprising:

retaining information obtained by measuring a tripping phase of the circuit breaker and the residual magnetic flux of the transformer when the circuit breaker is tripped for at least one time;

outputting a tripping instruction for tripping the circuit breaker in the same tripping phase, based on the retained information; and closing the circuit breaker based on the tripping phase in response to the tripping instruction.

39. A transformer inrush current suppression method for suppressing a transformer inrush current of a circuit breaker which makes and breaks connection between an electric power system for a three-phase alternating current, including a power supply and a transformer which converts a three-phase alternating current voltage into a single-phase alternating current voltage, the method comprising:

measuring the three-phase alternating current voltage at a side of the transformer with respect to the circuit breaker;

calculating three line-to-line residual magnetic fluxes of the transformer generated after the transformer is disconnected by the circuit breaker, based on the measured three-phase alternating current voltage at the side of the transformer;

detecting a line-to-line having the largest residual magnetic flux from among the calculated three line-to-line residual magnetic fluxes;

measuring a three-phase alternating current voltage at a side of the power supply with respect to the circuit breaker;

calculating the three line-to-line stable-state magnetic fluxes of the transformer, based on the measured three-phase alternating current voltage at the side of the power supply;

determining a phase of a voltage zero point at which, in the detected line-to-line having the largest residual magnetic flux, a polarity of a line-to-line voltage based on the measured three-phase alternating current voltage changes from the same polarity to the opposite polarity with respect to a polarity of the calculated line-to-line stable-state magnetic flux; and closing the circuit breaker in the determined phase.

40. The transformer inrush current suppression method according to claim 39, further comprising:

retaining information obtained by measuring a tripping phase of the circuit breaker and the residual magnetic flux of the transformer when the circuit breaker is tripped for at least one time;

outputting a tripping instruction for tripping the circuit breaker in the same tripping phase, based on the retained information; and closing the circuit breaker based on the tripping phase in response to the tripping instruction.

41. A transformer inrush current suppression method for suppressing a transformer inrush current of a circuit breaker which makes and breaks connection between an electric power system for a three-phase alternating current, including a power supply and a transformer which converts a three-phase alternating current voltage into a single-phase alternating current voltage, the method comprising:

measuring a single-phase alternating current voltage of the transformer;

converting the measured single-phase alternating current voltage of the transformer into the three-phase alternating current voltage of the transformer;

calculating three line-to-line residual magnetic fluxes of the transformer generated after the transformer is disconnected by the circuit breaker, based on the converted three-phase alternating current voltage of the transformer;

measuring a three-phase alternating current voltage at a side of the power supply with respect to the circuit breaker;

calculating three line-to-line stable-state magnetic fluxes of the transformer, based on the measured three-phase alternating current voltage at the side of the power supply;

determining a phase in which phases of the calculated three line-to-line stable-state magnetic fluxes are respectively the same in polarity as phases of the calculated three line-to-line residual magnetic fluxes; and closing the circuit breaker in the determined phase.

42. The transformer inrush current suppression method according to claim 41, further comprising:

retaining information obtained by measuring a tripping phase of the circuit breaker and the residual magnetic flux of the transformer when the circuit breaker is tripped for at least one time;

outputting a tripping instruction for tripping the circuit breaker in the same tripping phase, based on the retained information; and closing the circuit breaker based on the tripping phase in response to the tripping instruction.

43. A transformer inrush current suppression method for suppressing a transformer inrush current of a circuit breaker which makes and breaks connection between an electric power system for a three-phase alternating current, including a power supply and a transformer which converts a three-phase alternating current voltage into a single-phase alternating current voltage, the method comprising:

measuring a single-phase alternating current voltage of the transformer;

converting the measured single-phase alternating current voltage of the transformer into the three-phase alternating current voltage of the transformer;

calculating three line-to-line residual magnetic fluxes of the transformer generated after the transformer is disconnected by the circuit breaker, based on the converted three-phase alternating current voltage of the transformer;

detecting a line-to-line having the largest residual magnetic flux from among the calculated three line-to-line residual magnetic fluxes;

measuring a three-phase alternating current voltage at a side of the power supply with respect to the circuit breaker;

calculating three line-to-line stable-state magnetic fluxes of the transformer, based on the measured three-phase alternating current voltage at the side of the power supply;

determining a phase of a voltage zero point at which, in the detected line-to-line having the largest residual magnetic flux, a polarity of a line-to-line voltage based on the converted three-phase alternating current voltage of the transformer changes from the same polarity to the opposite polarity with respect to a polarity of the calculated line-to-line stable-state magnetic flux; and closing the circuit breaker in the determined phase.

44. The transformer inrush current suppression method according to claim 43, further comprising:

retaining information obtained by measuring a tripping phase of the circuit breaker and the residual magnetic flux of the transformer when the circuit breaker is tripped for at least one time;

outputting a tripping instruction for tripping the circuit breaker in the same tripping phase, based on the retained information; and closing the circuit breaker based on the tripping phase in response to the tripping instruction.

45. A transformer inrush current suppression method for suppressing a transformer inrush current of a circuit breaker which makes and breaks connection between an electric power system for a three-phase alternating current, including a power supply and a transformer which converts a three-phase alternating current voltage into a single-phase alternating current voltage, the method comprising:

measuring a single-phase alternating current voltage of the transformer;

calculating residual magnetic flux of a winding at a side of the single-phase alternating current of the transformer generated after the transformer is disconnected by the circuit breaker, based on the measured single-phase alternating current voltage;

measuring a three-phase alternating current voltage at a side of the power supply with respect to the circuit breaker;

converting the measured three-phase alternating current voltage at the side of the power supply into the single-phase alternating current voltage of the transformer;

calculating stable-state magnetic flux of a winding at a side of the single-phase alternating current of the transformer, based on the converted single-phase alternating current voltage of the transformer;

determining a phase in which a phase of the stable-state magnetic flux of the winding at the side of the calculated single-phase alternating current is the same as a phase of the residual magnetic flux of the winding at the side of the calculated single-phase alternating current; and closing the circuit breaker in the determined phase.

46. The transformer inrush current suppression method according to claim 45, further comprising:

retaining information obtained by measuring a tripping phase of the circuit breaker and the residual magnetic flux of the transformer when the circuit breaker is tripped for at least one time;

outputting a tripping instruction for tripping the circuit breaker in the same tripping phase, based on the retained information; and closing the circuit breaker based on the tripping phase in response to the tripping instruction.

47. A transformer inrush current suppression method for suppressing a transformer inrush current of a circuit breaker which makes and breaks connection between an electric power system for a three-phase alternating current, including a power supply and a Scott connection transformer including a main transformer and a teaser transformer, the method comprising:

measuring a three-phase alternating current voltage at a side of the Scott connection transformer with respect to the circuit breaker;

measuring a voltage to a ground at a middle point of the main transformer;

calculating residual magnetic flux of a primary winding of the Scott connection transformer generated after the Scott connection transformer is disconnected by the circuit breaker, based on the measured voltage to the ground at the middle point and the measured three-phase alternating current voltage at the side of the transformer;

measuring a three-phase alternating current voltage at a side of the power supply with respect to the circuit breaker;

calculating stable-state magnetic flux of a primary winding of the Scott connection transformer, based on the measured voltage to the ground at the middle point and the measured three-phase alternating current voltage at the side of the power supply;

determining a phase in which the calculated stable-state magnetic flux of the primary winding of the Scott connection transformer is the same as the calculated residual magnetic flux of the primary winding of the Scott connection transformer; and closing the circuit breaker in the determined phase.

48. The transformer inrush current suppression method according to claim 47, further comprising:

retaining information obtained by measuring a tripping phase of the circuit breaker and the residual magnetic flux of the Scott connection transformer when the circuit breaker is tripped for at least one time;

outputting a tripping instruction for tripping the circuit breaker in the same tripping phase, based on the retained information; and closing the circuit breaker based on the tripping phase in response to the tripping instruction.

* * * * *